US012279542B2

(12) United States Patent
Umemoto et al.

(10) Patent No.: US 12,279,542 B2
(45) Date of Patent: Apr. 22, 2025

(54) WORKING MACHINE

(71) Applicant: KUBOTA CORPORATION, Osaka (JP)

(72) Inventors: Susumu Umemoto, Sakai (JP); Yushi Matsuzaki, Sakai (JP); Shinnosuke Ishikawa, Sakai (JP); Takanori Morimoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 198 days.

(21) Appl. No.: 18/079,033

(22) Filed: Dec. 12, 2022

(65) Prior Publication Data
US 2023/0104274 A1 Apr. 6, 2023

Related U.S. Application Data

(63) Continuation of application No. PCT/JP2021/021111, filed on Jun. 3, 2021.

(30) Foreign Application Priority Data

Aug. 20, 2020 (JP) ................. 2020-139610
Aug. 20, 2020 (JP) ................. 2020-139611
Aug. 20, 2020 (JP) ................. 2020-139612

(51) Int. Cl.
*A01B 63/10* (2006.01)
*A01B 69/04* (2006.01)
*G05D 1/00* (2006.01)

(52) U.S. Cl.
CPC ............ *A01B 63/10* (2013.01); *A01B 69/008* (2013.01); *G05D 1/0214* (2013.01)

(58) Field of Classification Search
None
See application file for complete search history.

(56) References Cited

U.S. PATENT DOCUMENTS 10,980,166 B2 * 4/2021 Stanhope ............. A01C 21/005
2015/0160655 A1 6/2015 Korthals et al.
(Continued)

FOREIGN PATENT DOCUMENTS

CN 210466134 U 5/2020
JP 2016-224854 A 12/2016
(Continued)

OTHER PUBLICATIONS

Official Communication issued in International Patent Application No. PCT/JP2021/021111, mailed on Aug. 17, 2021.
(Continued)

Primary Examiner — Tamara L Weber
(74) Attorney, Agent, or Firm — Keating & Bennett, LLP

(57) ABSTRACT

A working machine includes a vehicle body to which a working device is connectable, a driving estimator to estimate whether the vehicle body is drivable along a road based on a road condition and a device condition, a controller to control a driving operation of the vehicle body based on an estimation result obtained by the driving estimator, and a communicator to transmit to an external device driving information regarding driving the vehicle body under control of the controller. The controller is configured or programmed to drive the vehicle body based on a command received from the external device after transmission of the driving information from the communicator to the external device.

14 Claims, 30 Drawing Sheets

(56) References Cited

U.S. PATENT DOCUMENTS

| | | | |
|---|---|---|---|
| 2016/0052546 A1 | 2/2016 | Arakane et al. | |
| 2017/0322550 A1 | 11/2017 | Yokoyama | |
| 2017/0339822 A1* | 11/2017 | Gresch | B62D 6/002 |
| 2020/0033143 A1* | 1/2020 | Hiramatsu | G05D 1/228 |
| 2020/0363811 A1* | 11/2020 | Nishii | G05D 1/0219 |
| 2021/0173399 A1* | 6/2021 | Richard | B60W 50/14 |
| 2021/0195823 A1 | 7/2021 | Yuasa et al. | |

FOREIGN PATENT DOCUMENTS

| | | |
|---|---|---|
| JP | 2019-4731 A | 1/2019 |
| JP | 2019-175262 A | 10/2019 |
| JP | 2020-43818 A | 3/2020 |
| JP | 2020-65451 A | 4/2020 |

OTHER PUBLICATIONS

Official Communication issued in corresponding European Patent Application No. 21858011.6, mailed on Jul. 29, 2024, 17 pages.

* cited by examiner

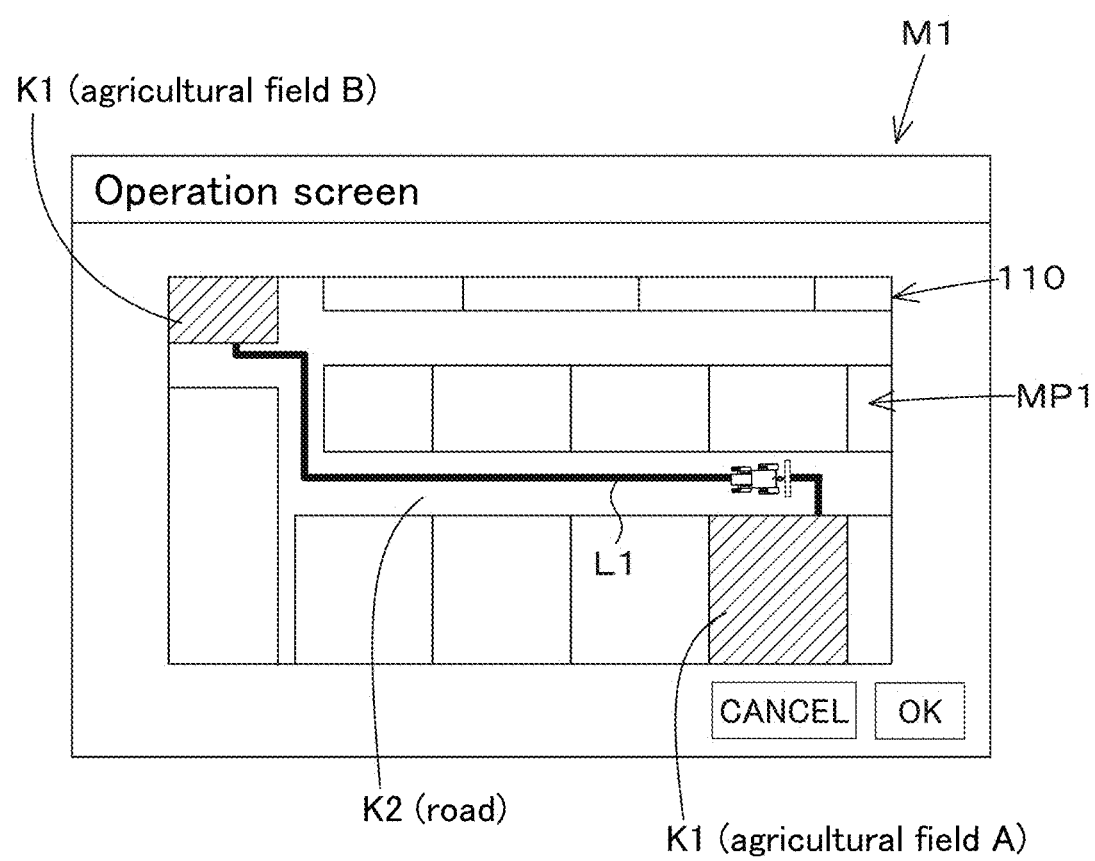

Fig.5A
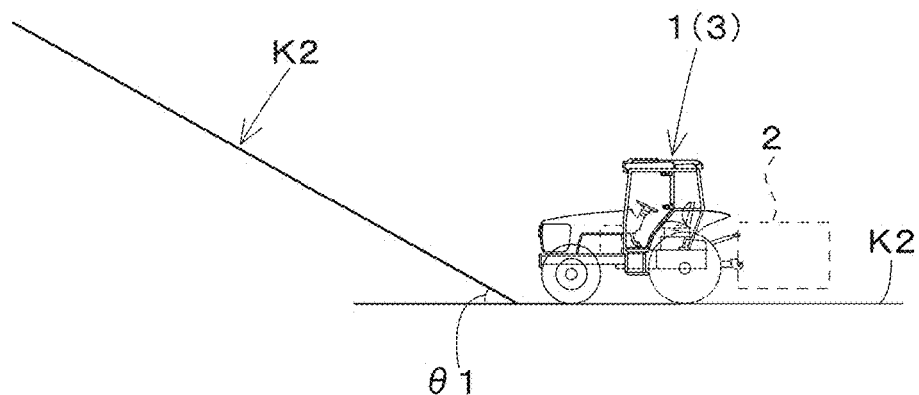
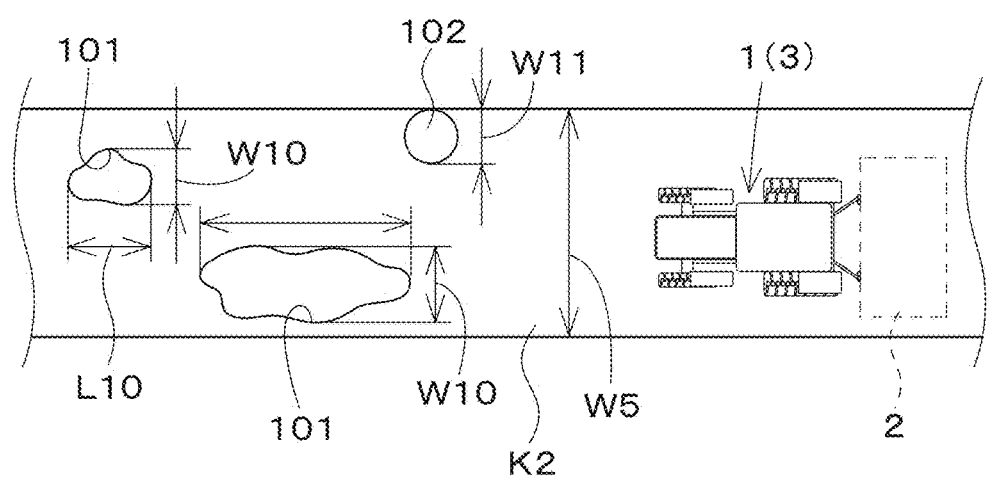
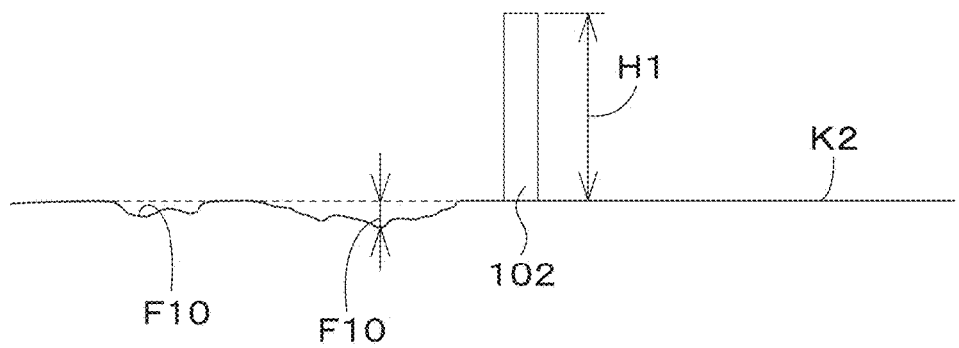

Fig.5B
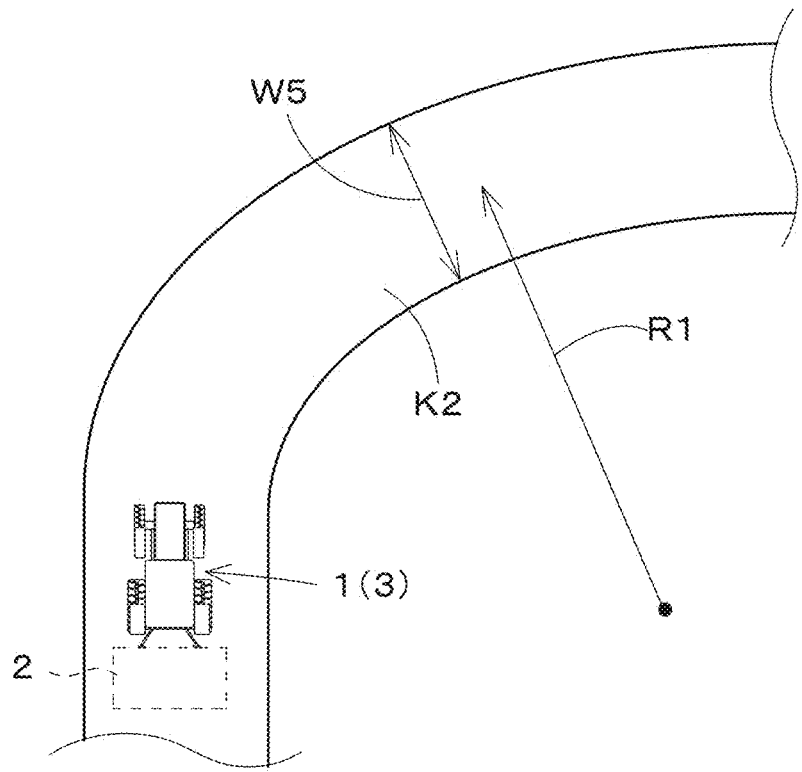
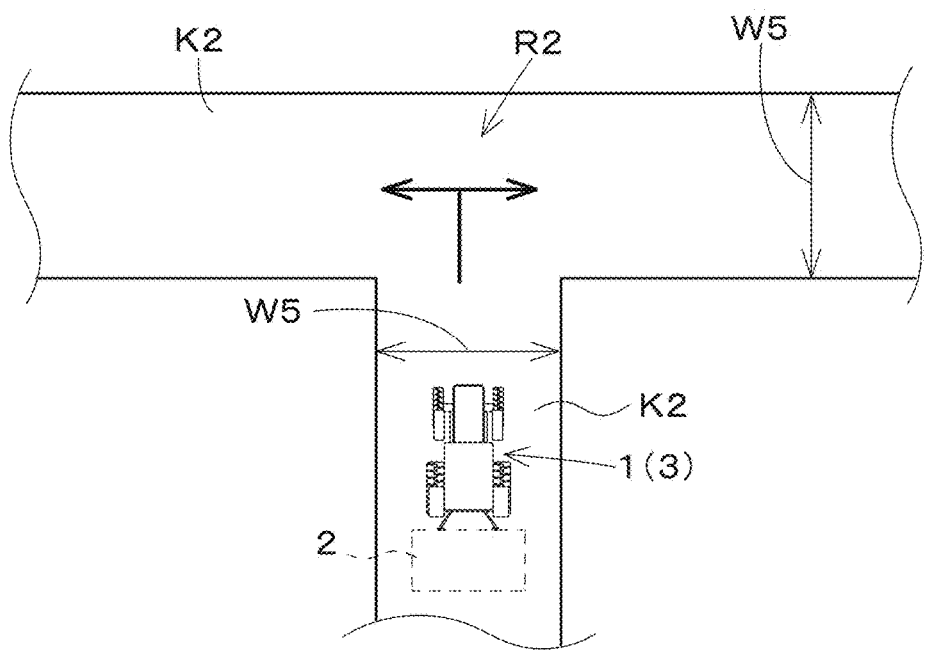

Fig.6
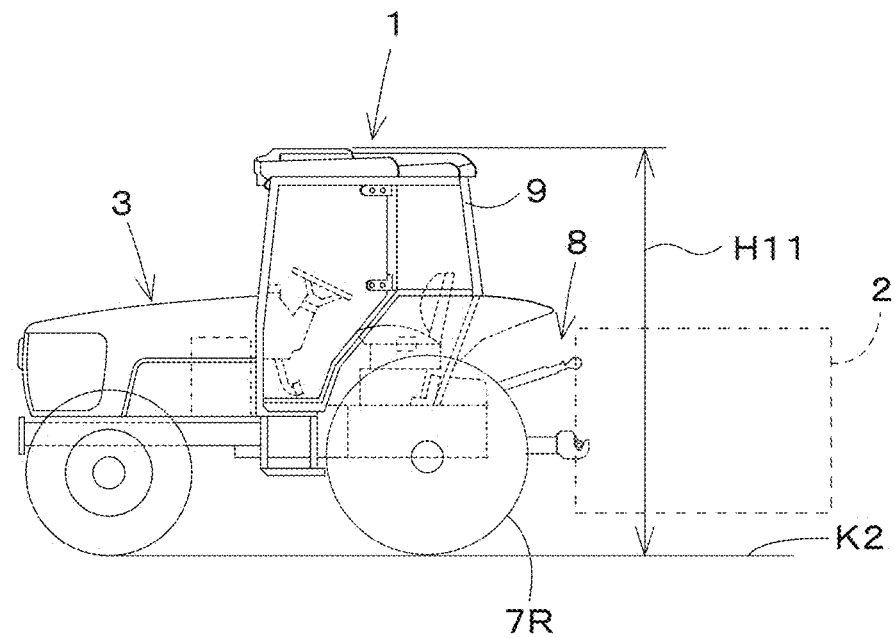
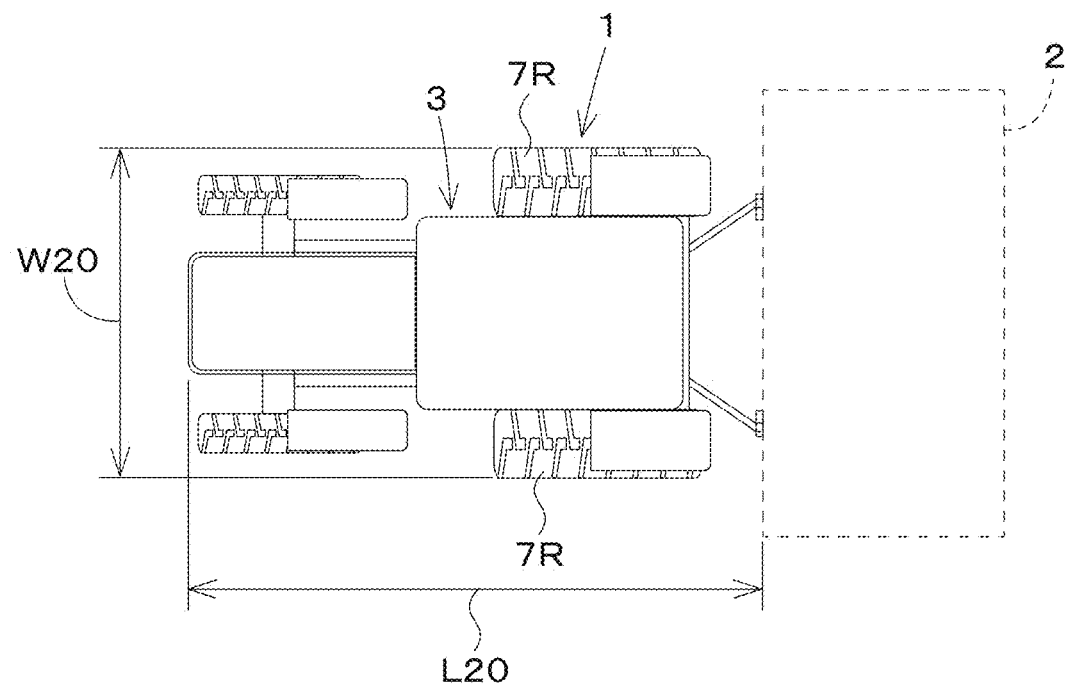

Fig.7A
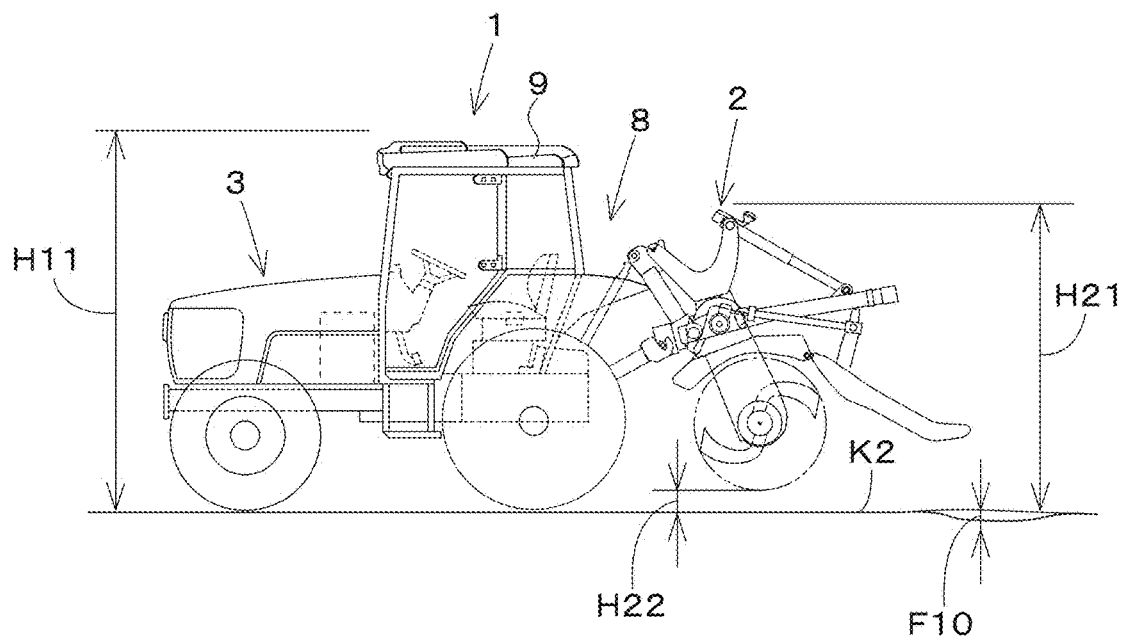
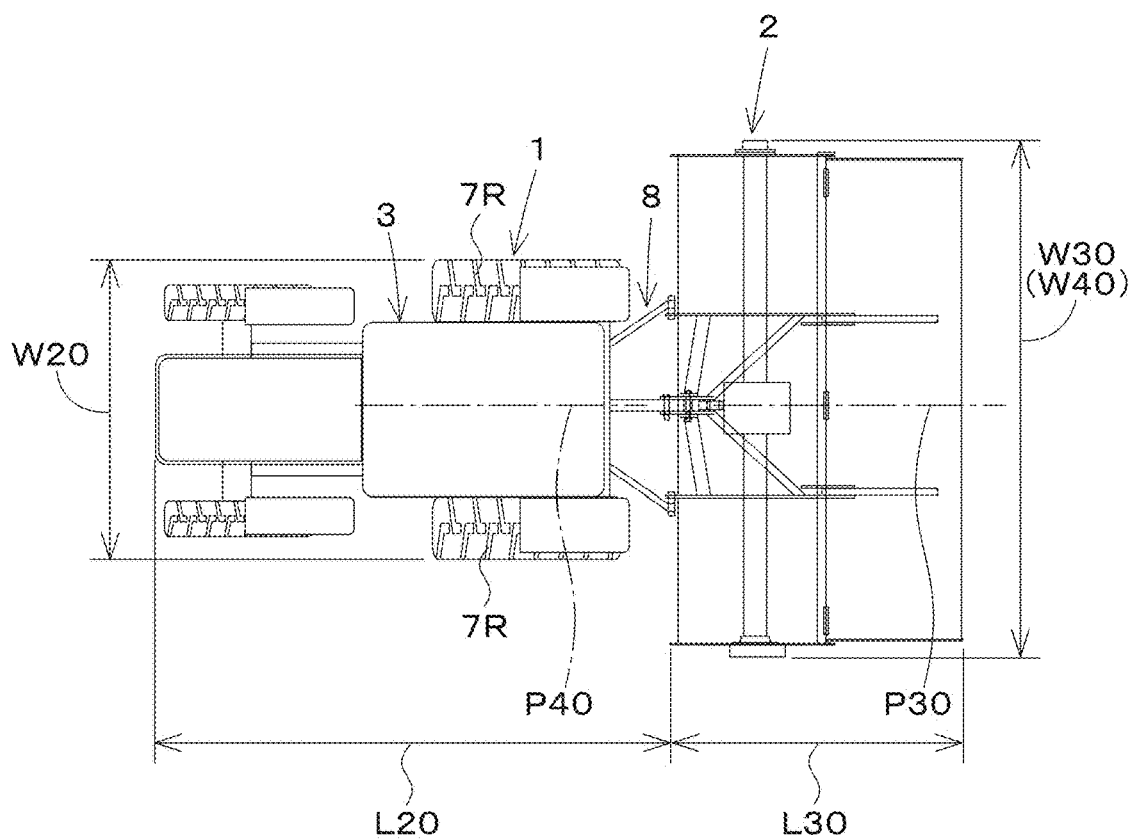

Fig.7B
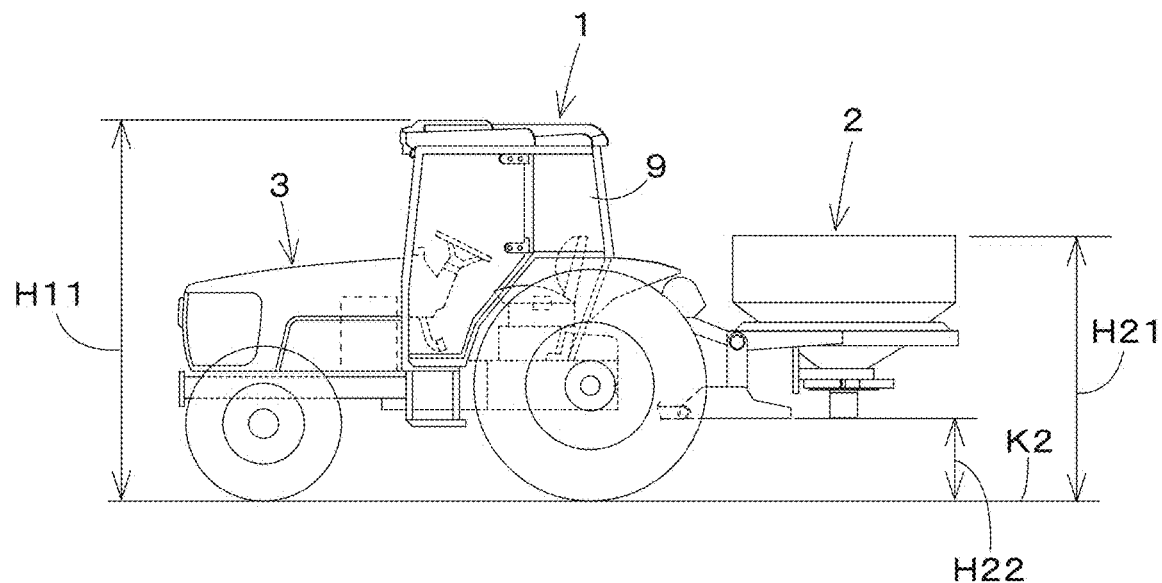
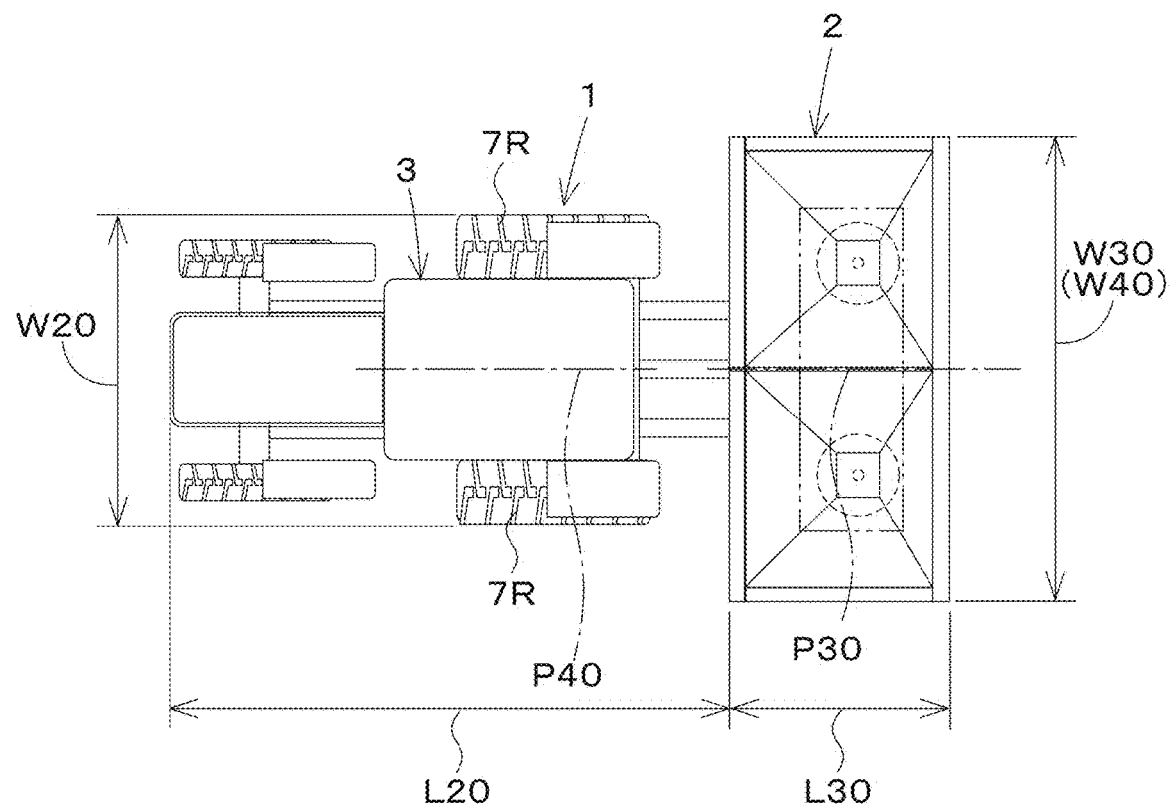

Fig.7C
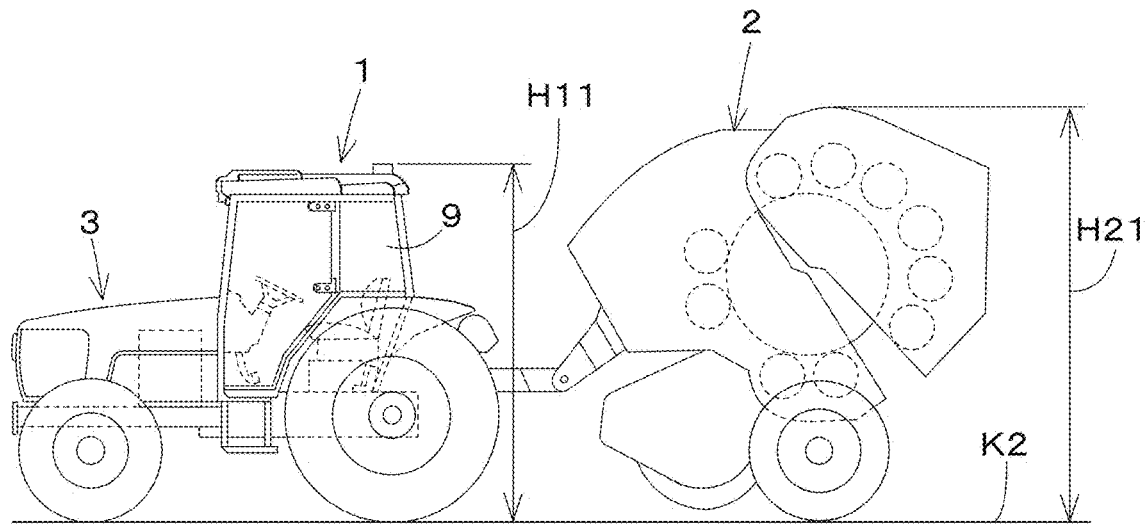
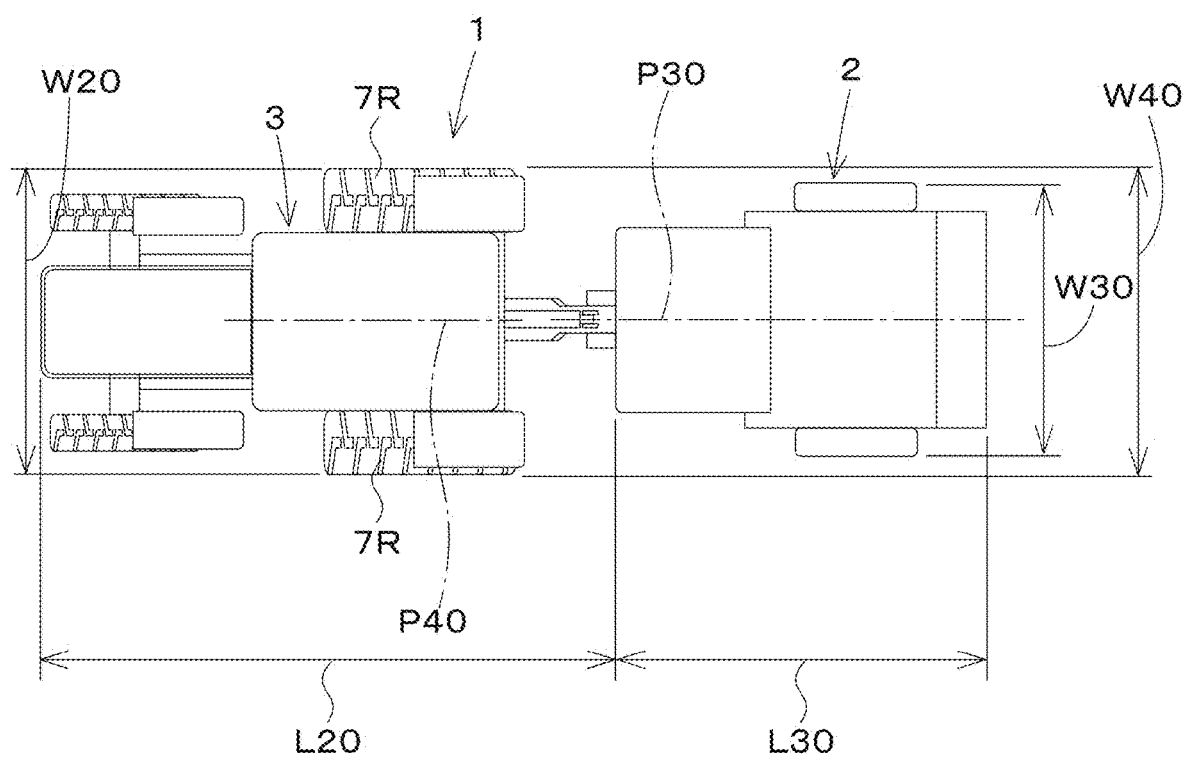

| Input screen | | | | |
|---|---|---|---|---|
| Attachment heights | H21 | | H22 | |
| Attachment width | W30 | | | |
| Overall width | W40 | | | |
| Offset width | W50 | | | |
| Length of working device | L30 | | | |
| | | | CANCEL | OK |

Fig.10
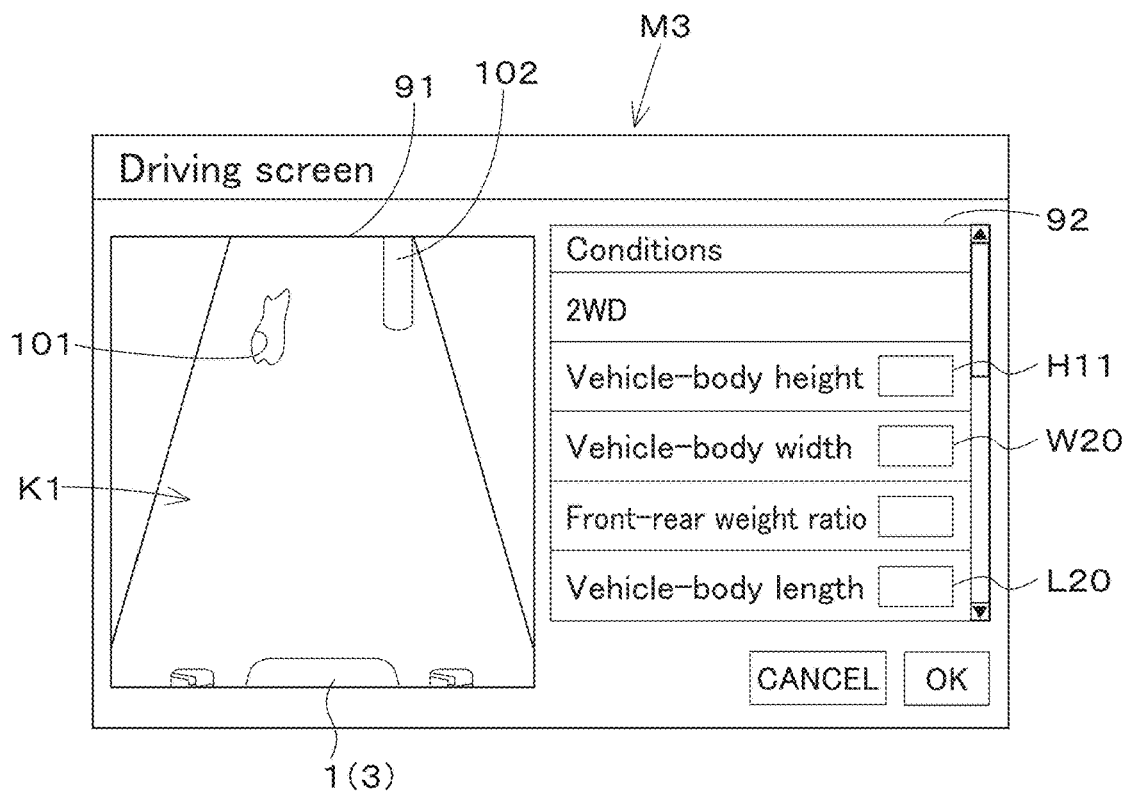
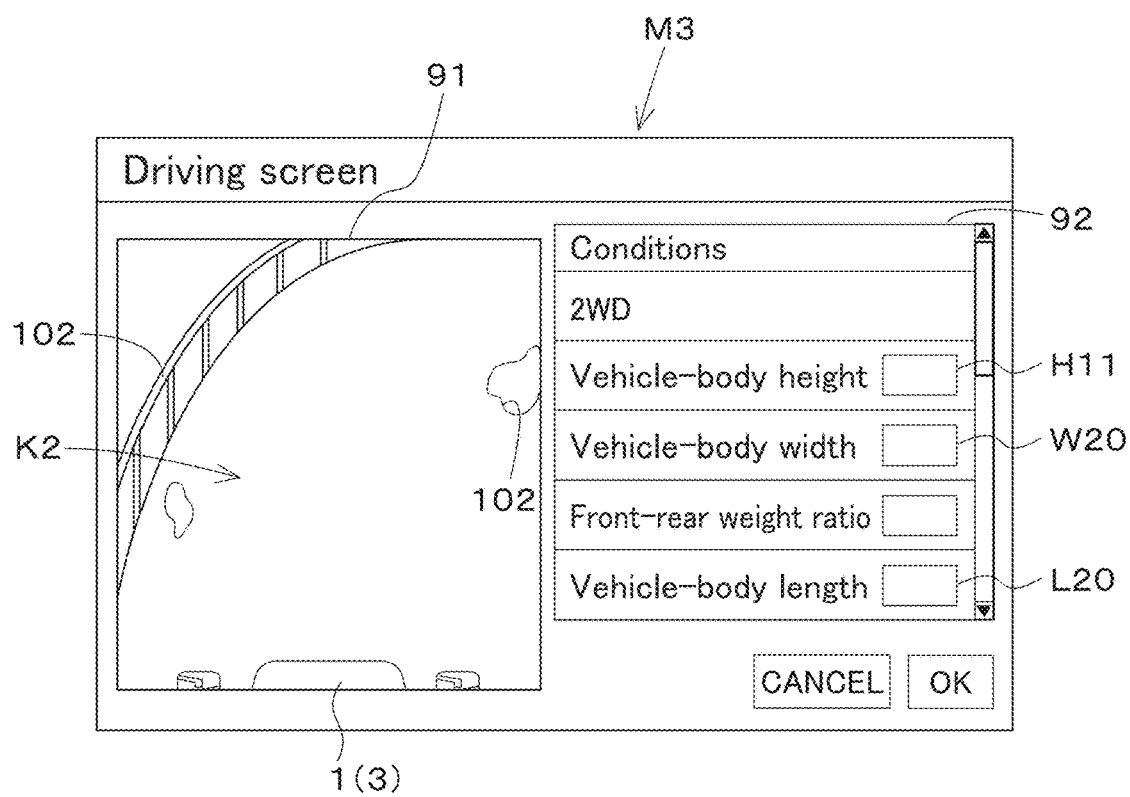

Fig.12

| First device condition (device condition at stoppage of autonomous driving operation) | Road condition | Undrivable (estimation result) | Second device condition (device condition after change request) | Drivable (estimation result) |
|---|---|---|---|---|
| 2WD | Road inclination θ1 | Road inclination θ1 ≥ threshold, 2WD | 4WD | Road inclination θ1 ≥ threshold, 4WD |
| Weight ratio | Road inclination θ1 | Front ratio > rear ratio | Increased rear ratio | Front ratio ≤ rear ratio |
| Attachment height H22 | Depth F10 | Depth F10 ≥ attachment height H22 | Increased attachment height H22 | Depth F10 < attachment height H22 |
| Attachment height H22 | Depth F10 | Attachment height H22 − depth F10 ≤ threshold | Increased attachment height H22 | Attachment height H22 − depth F10 > threshold |
| Attachment height H21 | Structure height H1 | Attachment height H21 < structure height H1 − Structure height H1 − attachment height H21 < threshold | Reduced attachment height H21 | Attachment height H21 < structure height H1 − Structure height H1 − attachment height H21 ≥ threshold |

| Threshold | Evaluation | Default value |
|---|---|---|
| First threshold | Road inclination | 30 degrees (deg) |
| Second threshold | Difference between attachment height H22 and depth F10 | 20cm |
| Third threshold | Difference between road width W6 and overall width W40 | 10cm |
| Fourth threshold | Difference between structure height H1 and vehicle-body height H11 | 30cm |
| Fifth threshold | Difference between road width W5 and vehicle-body width W20<br>Difference between road width W5 and overall width W40 | 10cm |
| Sixth threshold | Difference between radius R1 of curve and minimum turning radius R3 | 40cm |
| Seventh threshold | Gap between path J1 and edge of road K2 | 20cm |

Setting screen

| | Default value | Corrected value |
|---|---|---|
| First threshold | 30 deg | |
| Second threshold | 20 cm | |
| Third threshold | 10 cm | 99 |
| Fourth threshold | 30 cm | |
| Fifth threshold | 10 cm | |
| Sixth threshold | 40 cm | |
| Seventh threshold | 20 cm | |

M4

CANCEL  OK

WORKING MACHINE

CROSS REFERENCE TO RELATED APPLICATIONS

This application is a continuation application of International Application No. PCT/JP2021/021111, filed on Jun. 3, 2021, which claims the benefit of priority to Japanese Patent Application No. 2020-139610, filed on Aug. 20, 2020, to Japanese Patent Application No. 2020-139611, filed on Aug. 20, 2020, and to Japanese Patent Application No. 2020-139612, filed on Aug. 20, 2020. The entire contents of each of these applications are hereby incorporated herein by reference.

BACKGROUND OF THE INVENTION

1. Field of the Invention

The present invention relates to, for example, a working machine including a vehicle body to which a working device is connectable.

2. Description of the Related Art

Japanese Unexamined Patent Application Publication No. 2020-43818 and Japanese Unexamined Patent Application Publication No. 2019-4731 describe known technologies for assisting driving of a tractor. Japanese Unexamined Patent Application Publication No. 2020-43818 describes an agricultural field working vehicle that is autonomously driven along a plurality of working travel paths that are parallel to each other and connected to each other with a turning travel path. The agricultural field working vehicle includes a vehicle position calculator that calculates a vehicle position and a vehicle orientation and an autonomous driving control unit that autonomously drives the agricultural field working vehicle along the working travel paths based on the working travel paths and the vehicle position.

Japanese Unexamined Patent Application Publication No. 2019-4731 describes a working machine including a first control unit that sets a steering angle of a steering device based on a travel route and a second control unit that sets a brake that a braking device is to apply to one of a first wheel and a second wheel provided on a vehicle body based on the travel route.

SUMMARY OF THE INVENTION

The agricultural field working vehicle described in Japanese Unexamined Patent Application Publication No. 2020-43818 can be driven autonomously along the working travel paths provided in an agricultural field. However, the autonomous driving operation is performed only in the agricultural field, and cannot be easily performed outside the agricultural field.

The working machine described in Japanese Unexamined Patent Application Publication No. 2019-4731 can be steered autonomously along a scheduled travel route. However, automatic steering is performed only in an agricultural field, and cannot be easily performed outside the agricultural field.

Preferred embodiments of the present invention provide working machines each of which can be easily driven along a road outside an agricultural field.

The preferred embodiments of the present invention solve one or more of the above-described technical problems by including the following characteristics.

A working machine includes a vehicle body to which a working device is connectable, a driving estimator to estimate whether the vehicle body is drivable along a road based on a road condition that is a condition of the road along which the vehicle body is driven and a device condition in which the working device is connected to the vehicle body, a controller to control a driving operation of the vehicle body based on an estimation result obtained as a result of estimation by the driving estimator, and a communicator to transmit, to an external device, driving information regarding the driving operation of the vehicle body under control of the controller. The controller is configured or programmed to drive the vehicle body based on a command received from the external device after transmission of the driving information from the communicator to the external device.

When the command received after the controller has stopped the driving operation based on the estimation result is to cancel stoppage of the driving operation, the controller may cancel the stoppage and restarts the driving operation.

When the command received after the controller has stopped the driving operation based on the estimation result is an instruction of the driving operation under remote control, the controller may restart the driving operation based on the instruction of the driving operation under remote control.

The communicator may transmit, to the external device, a threshold for one of the road condition and the device condition based on which the driving estimator has estimated that the vehicle body is not drivable. When the communicator receives a corrected threshold, the driving estimator may estimate whether the vehicle body is drivable along the road based on the corrected threshold.

A working machine includes a vehicle body to which a working device is connectable, a driving estimator to estimate whether the vehicle body is drivable along a road based on a road condition that is a condition of the road along which the vehicle body is driven and a device condition in which the working device is connected to the vehicle body, and a controller to control a driving operation of the vehicle body based on an estimation result obtained as a result of estimation by the driving estimator.

The driving estimator may acquire, as the device condition, at least one of a driving mode of the vehicle body, a vehicle-body height of the vehicle body, a vehicle-body width of the vehicle body, a weight ratio of the vehicle body, and a length of the vehicle body, and may estimate whether the vehicle body is drivable along the road based on the acquired device condition and the road condition.

The driving estimator may acquire, as the device condition, at least one of an attachment height of the working device in an attached state, an attachment width, an overall width, an offset width of the working device with respect to the vehicle body, and a length of the working device, and may estimate whether the vehicle body is drivable along the road based on the acquired device condition and the road condition.

The driving estimator may acquire, as the road condition, at least one of an inclination of the road, a condition of an irregular portion of the road, presence or absence of pavement on the road, a width of a structure on the road, a height of the structure, a width of the road, a size of a curve of the road, and a condition of an intersection of the road, and may estimate whether the vehicle body is drivable along the road based on the acquired road condition and the device condition.

The working machine may be provided with a setting controller capable of changing the device condition.

The controller may stop the driving operation of the vehicle body when the driving estimator estimates that the vehicle body is not drivable.

The working machine may further include a communicator to transmit, to an external device, driving information obtained when the vehicle body is driven after the driving estimator has estimated whether the vehicle body is drivable along the road.

The working machine may further include a communicator to transmit, to an external device, a request for the driving operation under remote control when the driving estimator estimates that the vehicle body is not drivable. The controller may drive the vehicle body based on an instruction of the driving operation under remote control received by the communicator from the external device.

The working machine may further include a communicator to transmit, to an external device, a request for cancellation of stoppage of the driving operation when the driving estimator estimates that the vehicle body is not drivable and when the controller stops the driving operation. The controller may restart the driving operation when the communicator receives an instruction to cancel the stoppage of the driving operation.

The working machine may further include a communicator to transmit, to an external device, a request for a device condition that enables the vehicle body to be driven when the driving estimator estimates that the vehicle body is not drivable. When the communicator receives the device condition that enables the vehicle body to be driven transmitted from the external device in response to the request, the controller may change the device condition of at least one of the vehicle body and the working device to the device condition that enables the vehicle body to be driven.

The working machine may further include a communicator to transmit, to the external device, a threshold based on which the driving estimator has estimated that the vehicle body is not drivable. When the communicator receives a corrected threshold, the driving estimator may estimate whether the vehicle body is drivable along the road based on the corrected threshold.

A working machine includes a vehicle body to which a working device is connectable, a detector to detect a road condition that is a condition of a road along which the vehicle body is driven, and a position controller to refer to the road condition detected by the detector and a device condition in which the working device is connected to the vehicle body and change the device condition so that the vehicle body is drivable along the road.

The position controller may change, as the device condition, at least one of a driving mode of the vehicle body, a vehicle-body height of the vehicle body, a weight ratio of the vehicle body, and a length of the vehicle body.

The position controller may change, as the device condition, at least one of an attachment height of the working device in an attached state, an overall width, and an offset width of the working device with respect to the vehicle body.

A communicator may be provided and may transmit, to an external device, a request for confirmation of whether the vehicle body is drivable along the road when the position controller has changed the device condition.

The position controller may transmit, to an external device, a request for the device condition enabling the vehicle body to be driven under the road condition detected by the detector.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 4 illustrates a setting screen displaying an example of a route for moving a working vehicle from an agricultural field A to an agricultural field B.

FIG. 5A illustrates examples of road conditions.

FIG. 5B illustrates road conditions other than those in FIG. 5A.

FIG. 6 illustrates examples of vehicle conditions.

FIG. 7A illustrates an example in which a working device connected to the working vehicle is a cultivator.

FIG. 7B illustrates an example in which the working device connected to the working vehicle is a spreader.

FIG. 7C illustrates an example in which the working device connected to the working vehicle is a baler.

FIG. 8 illustrates an example of an input screen.

FIG. 10 illustrates an example of a driving screen.

FIG. 12 shows the relationship between a first device condition under which the working vehicle is undrivable and a second device condition under which the working vehicle is drivable.

FIG. 13A illustrates examples of first to seventh thresholds.

FIG. 13B illustrates an example of a setting screen for setting the first to seventh thresholds.

DETAILED DESCRIPTION OF THE PREFERRED EMBODIMENTS

Figure 1:
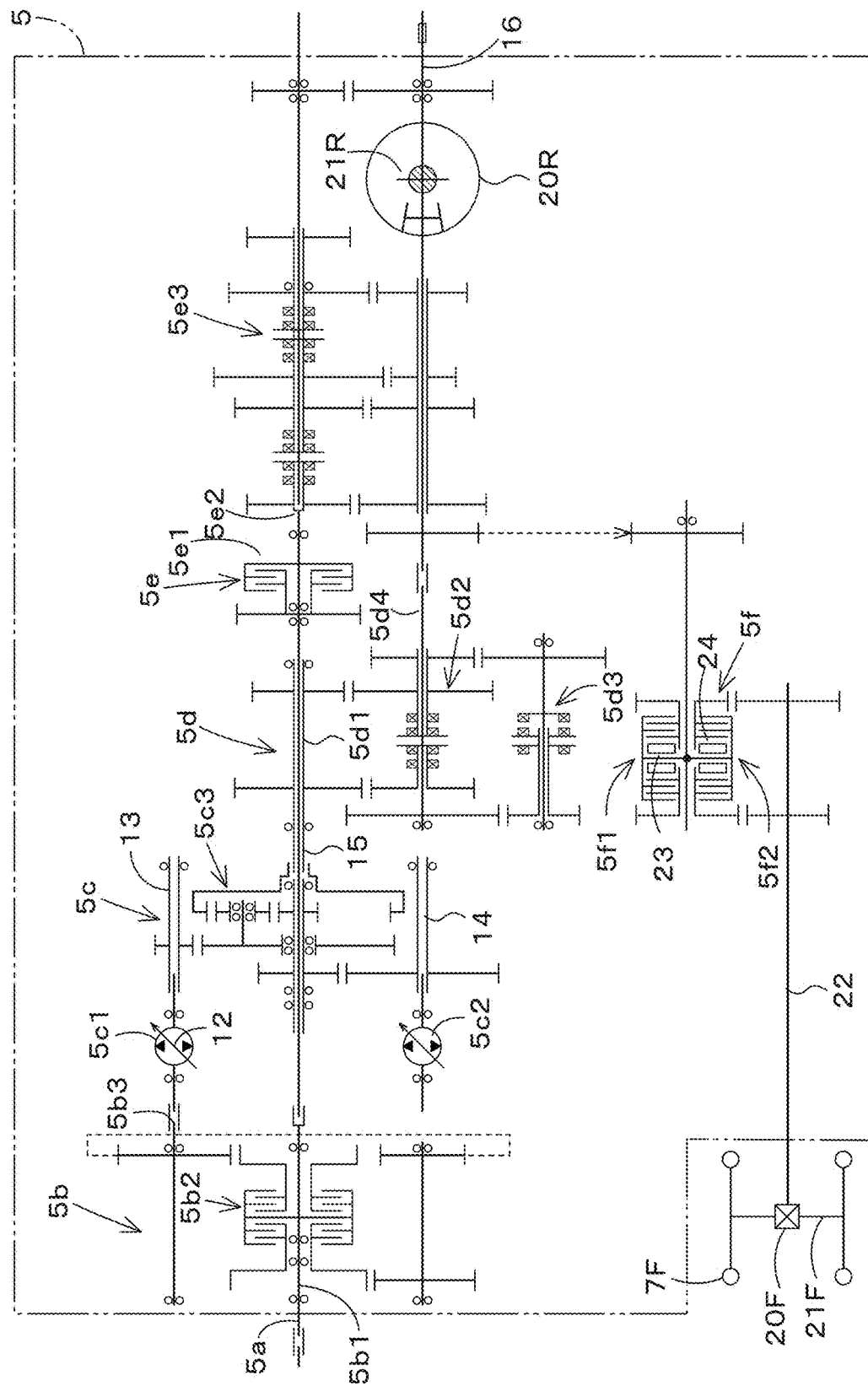
FIG. 1 illustrates the structure of a transmission.

The preferred embodiments will now be described with reference to the accompanying drawings, wherein like reference numerals designate corresponding or identical elements throughout the various drawings. The drawings are to be viewed in an orientation in which the reference numerals are viewed correctly.

Preferred embodiments of the present invention will now be described with reference to the drawings.

First Preferred Embodiment

Figure 14:
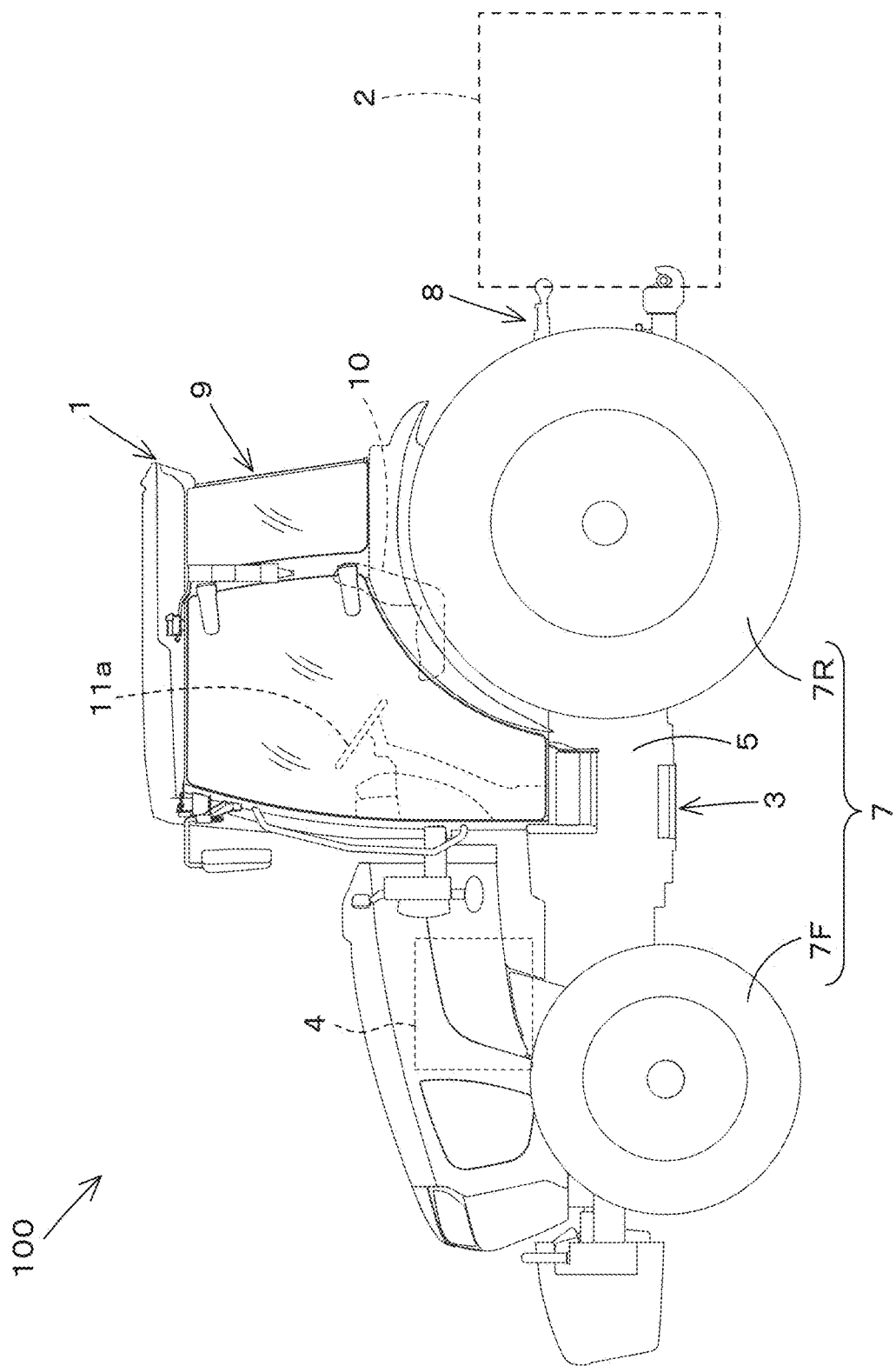
FIG. 14 illustrates the working machine according to a first preferred embodiment of the present invention.

FIG. 14 illustrates an example of a working machine 100. The working machine 100 is, for example, a tractor to which a working device is connected, a rice transplanter including a working device, or a combine including a working device.

As illustrated in FIG. 14, the working machine 100 includes a working vehicle 1 and a working device 2. The working vehicle 1 is, for example, a tractor.

The working vehicle 1 includes a vehicle body 3 including a traveling device 7, a prime mover 4, a transmission 5, a connector 8, and a steering device 11. The traveling device 7 includes front wheels 7F and rear wheels 7R. The front wheels 7F may be tires or crawler units. The rear wheels 7R may also be tires or crawler units. The prime mover 4 is, for example, an internal combustion engine, such as a gasoline engine or a diesel engine, or an electric motor. In this preferred embodiment, the prime mover 4 is a diesel engine.

The transmission 5 is capable of speed-changing a propelling force of the traveling device 7 and switching a movement direction of the traveling device 7 between forward and reverse. The vehicle body 3 includes a cabin 9. An operator's seat 10 is provided in the cabin 9.

A connector 8 is provided on the back of the vehicle body 3. The working device 2 is removably attachable to the connector 8. In this preferred embodiment, the connector 8 is a raising/lowering device that raises and lowers the working device 2 that is attached.

The working device 2 performs various operations on, for example, an agricultural field (ground) or crops planted in the agricultural field, and is connected to the working vehicle 1. Examples of the working device 2 include a cultivator that performs cultivation, a fertilizer spreader that spreads fertilizers, an agricultural chemical spreader that spreads agricultural chemicals, a harvester that harvests crops, a mower that mows grass or the like, a tedder that spreads grass or the like, a rake that collects hay or the like, and a baler that forms hay or the like into bales.

As illustrated in FIG. 1, the transmission 5 includes a main shaft (propeller shaft) 5a, a shuttle unit 5b, a main transmission unit 5c, an auxiliary transmission unit 5d, a PTO power transmission unit 5e, and a front transmission unit 5f. The propeller shaft 5a is rotatably supported by a housing case of the transmission 5. The propeller shaft 5a receives power from a crankshaft of the prime mover 4.

The shuttle unit 5b includes a shuttle shaft 5b1 and a forward/reverse switch 5b2. The shuttle shaft 5b1 receives power from the propeller shaft 5a. The forward/reverse switch 5b2 is, for example, a hydraulic clutch. The hydraulic clutch is turned on and off to switch the rotation direction of the shuttle shaft 5b1, that is, the movement direction of the working vehicle 1 between forward and reverse.

The main transmission unit 5c is a continuously variable transmission mechanism that seamlessly changes power input thereto. The continuously variable transmission mechanism includes a hydraulic pump 5c1, a hydraulic motor 5c2, and a planetary gear mechanism 5c3. The hydraulic pump 5c1 is rotated by power from an output shaft 5b3 of the shuttle unit 5b. The hydraulic pump 5c1 is, for example, a variable displacement pump including a swash plate 12, and the flow rate of hydraulic fluid delivered from the hydraulic pump 5c1 can be changed by changing an angle of the swash plate 12 (swash plate angle). The hydraulic motor 5c2 is a motor rotated by the hydraulic fluid delivered from the hydraulic pump 5c1 through a fluid passage circuit including, for example, pipes. The rotational speed of the hydraulic motor 5c2 can be changed by changing the swash plate angle of the hydraulic pump 5c1 or the power input to the hydraulic pump 5c1.

The planetary gear mechanism 5c3 includes a plurality of gears and power transmission shafts, such input and output shafts. The planetary gear mechanism 5c3 includes an input shaft 13 that receives power from the hydraulic pump 5c1, an input shaft 14 that receives power from the hydraulic motor 5c2, and an output shaft 15 that outputs power. The planetary gear mechanism 5c3 transmits power obtained by combining the power from the hydraulic pump 5c1 and the power from the hydraulic motor 5c2 to the output shaft 15.

Thus, according to the main transmission unit 5c, power output to the auxiliary transmission unit 5d can be changed by changing, for example, the swash plate angle of the swash plate 12 included in the hydraulic pump 5c1 or the rotational speed of the prime mover 4. Although the main transmission unit 5c includes a continuously variable transmission mechanism, the main transmission unit 5c may be a stepped transmission mechanism that performs a speed change with gears.

The auxiliary transmission unit 5d is a transmission mechanism including a plurality of gears for speed-changing the power. The auxiliary transmission unit 5d changes the connection (engagement) between the gears as appropriate to change and output (speed-change) the power input thereto from the output shaft 15 of the planetary gear mechanism 5c3. The auxiliary transmission unit 5d includes an input shaft 5d1, a first transmission clutch 5d2, a second transmission clutch 5d3, and an output shaft 5d4. The input shaft 5d1 receives the power input from the output shaft 15 of the planetary gear mechanism 5c3 and outputs the input power to the first transmission clutch 5d2 and the second transmission clutch 5d3 through, for example, gears. Each of the first transmission clutch 5d2 and the second transmission clutch 5d3 is engaged or disengaged so that the input power is changed and output to the output shaft 5d4. The power output to the output shaft 5d4 is transmitted to a rear wheel differential 20R. The rear wheel differential 20R rotatably supports a rear axle 21R to which the rear wheels 7R are attached.

The PTO power transmission unit 5e includes a PTO clutch 5e1, a PTO propeller shaft 5e2, and a PTO transmission unit 5e3. The PTO clutch 5e1 is, for example, a hydraulic clutch. The hydraulic clutch is turned on and off to switch between a state in which the power from the propeller shaft 5a is transmitted to the PTO propeller shaft 5e2 (connected state) and a state in which the power from the propeller shaft 5a is not transmitted to the PTO propeller shaft 5e2 (disconnected state). The PTO transmission unit 5e3 includes a transmission clutch and a plurality of gears. The PTO transmission unit 5e3 changes power (rotational speed) input thereto from the PTO propeller shaft 5e2 and outputs the power. The power output from the PTO transmission unit 5e3 is transmitted to a PTO shaft 16 through, for example, gears.

The front transmission unit 5f includes a first front transmission clutch 5f1 and a second front transmission clutch 5f2. The first front transmission clutch 5f1 and the second front transmission clutch 5f2 are capable of receiving power from the auxiliary transmission unit 5d. For example, the power is transmitted from the output shaft 5d4 to the first front transmission clutch 5f1 and the second front transmission clutch 5f2 through gears and transmission shafts. The power from the first front transmission clutch 5f1 and the second front transmission clutch 5f2 can be transmitted to a front axle 21F through a front transmission shaft 22. More specifically, the front transmission shaft 22 is connected to a front wheel differential 20F, and the front axle 21F, to which the front wheels 7F are attached, is rotatably supported by the front wheel differential 20F.

The first front transmission clutch 5f1 and the second front transmission clutch 5f2 are, for example, hydraulic clutches. The first front transmission clutch 5f1 is connected to a fluid passage, and the fluid passage is connected to a control valve 23 to which hydraulic fluid delivered from a hydraulic pump is supplied. The first front transmission clutch 5f1 switches between a connected state and a disconnected state depending on an opening of the control valve 23. The second front transmission clutch 5f2 is connected to a fluid passage, and the fluid passage is connected to a control valve 24. The second front transmission clutch 5f2 switches between a connected state and a disconnected state depending on an opening of the control valve 24. Each of the control valve 23 and the control valve 24 is, for example, a two-position switching valve provided with a solenoid valve, and switches to the connected state or the disconnected state when a solenoid of the solenoid valve is energized or deenergized.

When the first front transmission clutch 5f1 is in the disconnected state and the second front transmission clutch 5f2 is in the connected state, the power of the auxiliary transmission unit 5d is transmitted to the front wheels 7F through the second front transmission clutch 5f2. Accordingly, a four-wheel drive (4WD) mode in which the front wheels and the rear wheels are driven by power is established, and the rotational speed of the front wheels is equal or substantially equal to the rotational speed of the rear wheels (equal-speed 4WD mode). When the first front transmission clutch 5f1 is in the connected state and the second front transmission clutch 5f2 is in the disconnected state, the four-wheel drive mode is established, and the rotational speed of the front wheels is higher than the rotational speed of the rear wheels (double-speed 4WD mode). When the first front transmission clutch 5f1 and the second front transmission clutch 5f2 are in the connected state, the power of the auxiliary transmission unit 5d is not transmitted to the front wheels 7F. Accordingly, a two-wheel drive (2WD) mode in which the rear wheels are driven by power is established.

Figure 2:
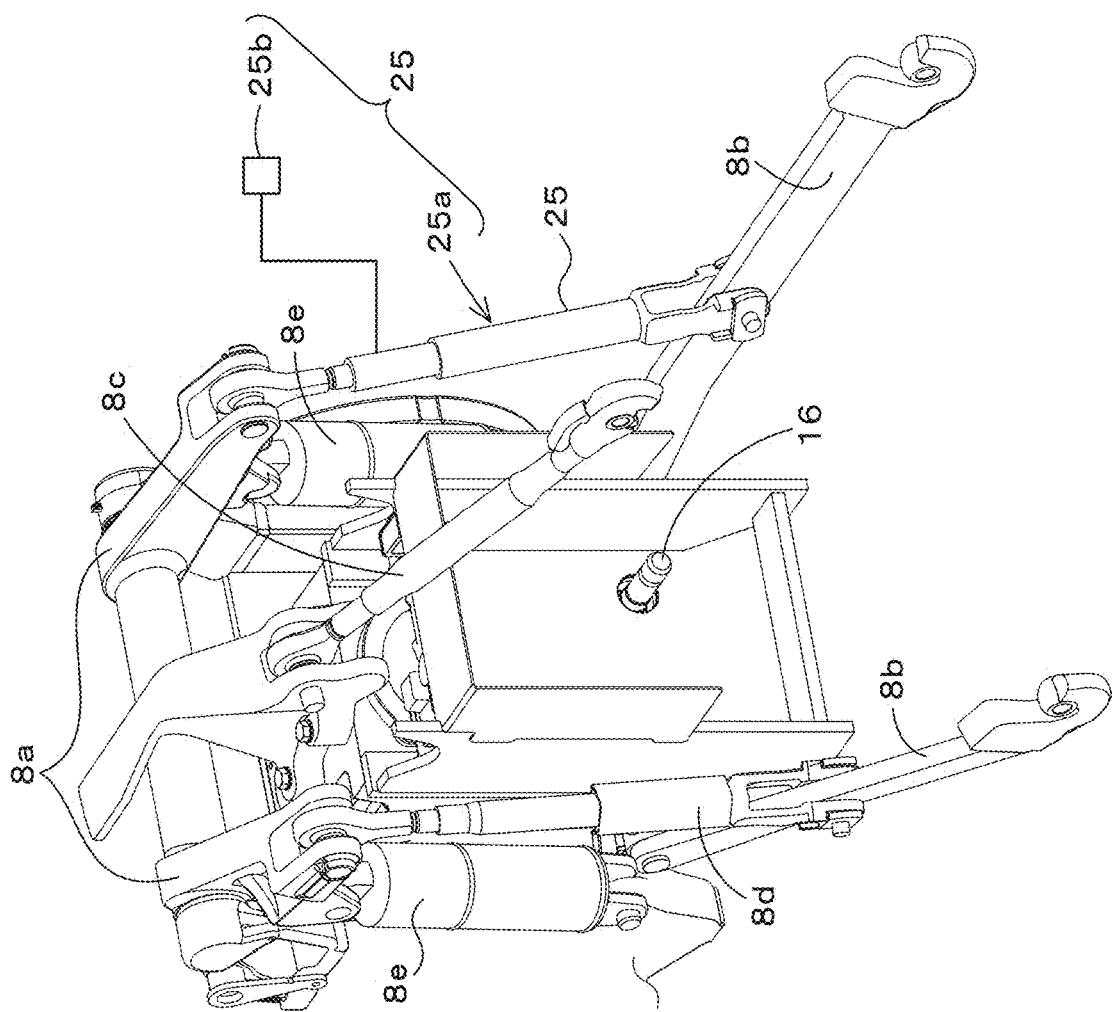
FIG. 2 is a perspective view of a connector.

As illustrated in FIG. 2, the connector (raising/lowering device) 8 includes lift arms 8a, lower links 8b, a top link 8c, lift rods 8d, and lift cylinders 8e. Front end portions of the lift arms 8a are supported by an upper rear portion of a case (transmission case) that accommodates the transmission 5 such that the lift arms 8a are swingable up and down. The lift arms 8a are driven to swing (raised and lowered) by the lift cylinders 8e. The lift cylinders 8e are hydraulic cylinders. Each lift cylinder 8e is connected to a hydraulic pump with a control valve provided therebetween. The control valve is, for example, a solenoid valve that extends and contracts the lift cylinders 8e.

Front end portions of the lower links 8b are supported by a lower rear portion of the transmission 5 such that the lower links 8b are swingable up and down. A front end portion of the top link 8c is supported by a rear portion of the transmission 5 at a location above the lower links 8b such that the top link 8c is swingable up and down. The lift rods 8d connect the lift arms 8a to the lower links 8b. The working device 2 is connected to rear portions of the lower links 8b and a rear portion of the top link 8c. When the lift cylinders 8e are driven (extended or contracted), the lift arms 8a are raised or lowered, and the lower links 8b connected to the lift arms 8a by the lift rods 8d are also raised or lowered. Thus, the working device 2 swings (is raised or lowered) about front portions of the lower links 8b.

The connector (raising/lowering device) 8 is provided with an angle changer 25. The angle changer 25 changes the position of the working device 2 attached to the vehicle body 3. The angle changer 25 includes a changing cylinder 25a including a hydraulic cylinder and a control valve 25b. The changing cylinder 25a is connected to a hydraulic pump with the control valve 25b provided therebetween. The control valve 25b is, for example, a solenoid valve, and extends and contracts the changing cylinder 25a. The changing cylinder 25a connects one of the lift arms 8a to a corresponding one of the lower links 8b.

Figure 3:
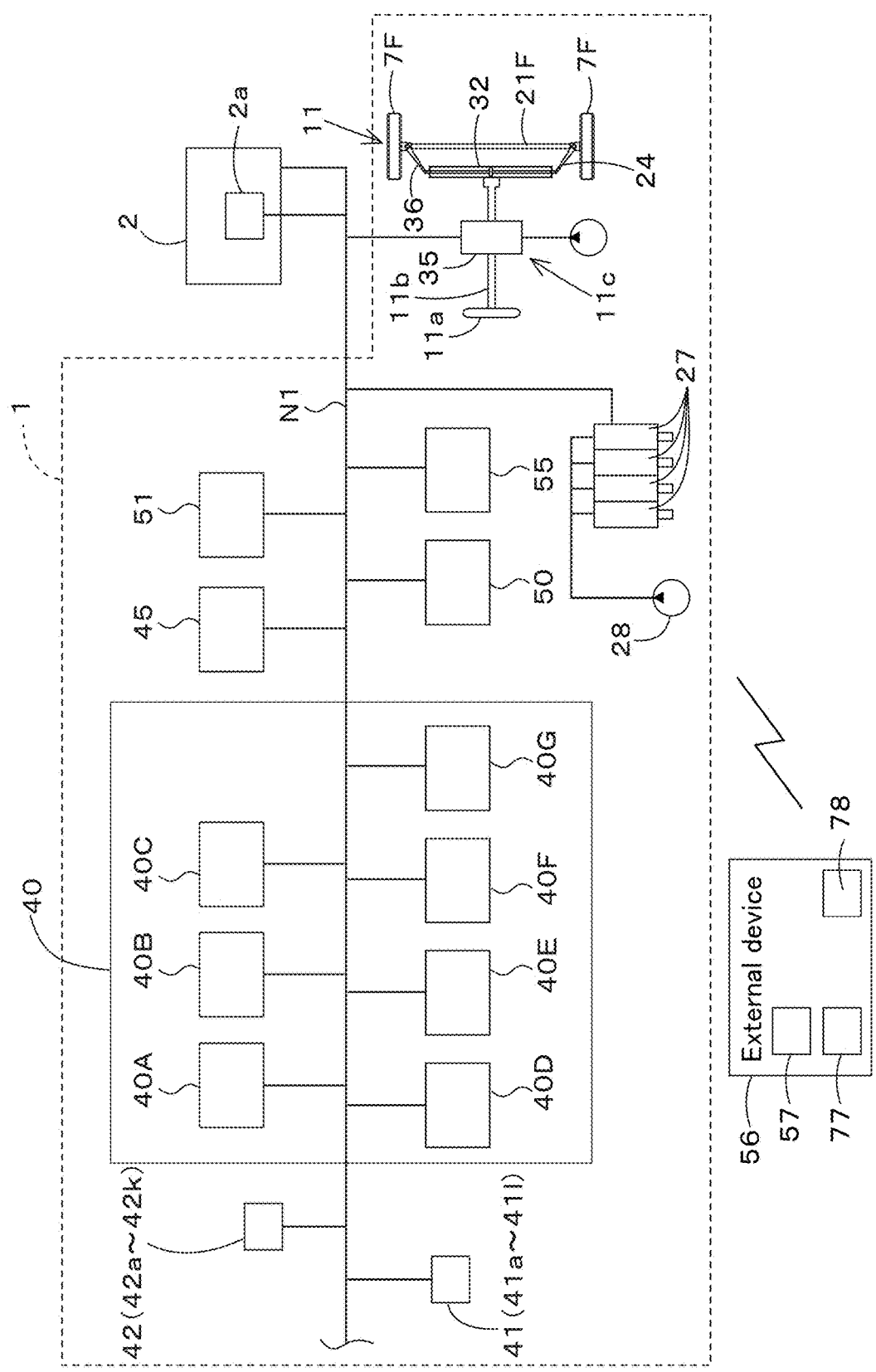
FIG. 3 is a control block diagram of a working machine.

As illustrated in FIG. 3, the working vehicle 1 includes a plurality of auxiliary valves 27. The auxiliary valves 27 are hydraulic switching valves to which hydraulic fluid is supplied from a hydraulic pump 28. The auxiliary valves 27 have output ports, and hydraulic hoses or the like are connectable to any of the output ports. The hydraulic hoses connected to any of the output ports of the auxiliary valves 27 are connected to hydraulic attachments of the working device 2, so that various hydraulic attachments attached to the working device 2 may be operated.

As illustrated in FIG. 3, the steering device 11 includes a steering wheel 11a, a rotating shaft (steering shaft) 11b that rotates together with the steering wheel 11a, and an assist mechanism (power steering mechanism) 11c that assists steering of the steering wheel 11a. The assist mechanism 11c includes a control valve 35 and a steering cylinder 32. The control valve 35 is, for example, a 3-position switching valve switchable in response to a movement of a spool or the like. The control valve 35 is also switchable in response to an operation of the steering shaft 11b. The steering cylinder 32 is connected to arms (knuckle arms) 36 that change the orientations of the front wheels 7F. Accordingly, when the steering wheel 11a is operated, a switching position and an opening of the control valve 35 are changed in response to the operation of the steering wheel 11a, and the steering cylinder 32 is extended or contracted leftward or rightward depending on the switching position and the opening of the control valve 35. As a result, the steering direction of the front wheels 7F can be changed. The above-described steering device 11 is an example, and the steering device 11 is not limited to the above-described structure.

As illustrated in FIG. 3, the working vehicle 1 includes a plurality of detectors 41. The detectors 41 detect the conditions of the working vehicle 1. The detectors 41 include, for example, a water temperature sensor 41a that detects a water temperature; a fuel sensor 41b that detects the amount of remaining fuel; a prime-mover rotation sensor (rotation sensor) 41c that detects a rotational speed of the prime mover 4; an accelerator pedal sensor 41d that detects an amount of operation of an accelerator pedal; a steering angle sensor 41e that detects a steering angle of the steering device 11; an angle sensor 41f that detects an angle of the lift arms 8a; an inclination detection sensor 41g that detects an inclination of the vehicle body 3 in a width direction (rightward or leftward); a velocity sensor 41h that detects a vehicle speed (velocity) of the vehicle body 3; a PTO rotation sensor (rotation sensor) 41i that detects a rotational speed of the PTO shaft; a battery sensor 41j that detects a voltage of a storage cell unit, such as a battery; a positioning device 41k that detects the position of the vehicle body 3; and a monitor 411 that monitors the regions surrounding the working vehicle 1. The above-described detectors 41 are examples, and the detectors 41 are not limited to the above-described sensors.

Referring to FIG. 3, the positioning device 41k is capable of detecting the position thereof (measured position information including latitude and longitude) by using satellite positioning systems (positioning satellites), such as D-GPS, GPS, GLONASS, BeiDou, Galileo, and Quasi-Zenith Satellite System (QZSS). More specifically, the positioning device 41k receives satellite signals (e.g., positions of the positioning satellites, transmission times, and correction information) transmitted from the positioning satellites, and determines the position of the working vehicle 1 (for example, latitude and longitude), that is, the vehicle body position, based on the satellite signals. The positioning device 41k may include inertial measurement units, such as an acceleration sensor that detects an acceleration and a gyroscope sensor that detects an angular velocity. The inertial measurement units enable detection of, for example, a roll angle, a pitch angle, and a yaw angle of the vehicle body 3 by using the acceleration sensor and the gyroscope sensor, and the vehicle body position can be corrected by using the detected roll angle, pitch angle, and yaw angle of the vehicle body 3. The inertial measurement units may be provided in the working vehicle 1 separately from the positioning device 41k. Referring to FIG. 3, the monitor 411 is, for example, an optical sensor or a sonic sensor. When the monitor 411 is an optical sensor, the monitor 411 is, for example, an imager, such as a camera, or a light detection and ranging (LiDAR) unit. The imager is a charge coupled device (CCD) camera including a CCD image sensor, or a complementary metal oxide semiconductor (CMOS) camera including a CMOS image sensor. The LiDAR unit (laser sensor) emits millions of pulses of infrared light per second and detects a distance to an object that reflects the infrared light by measuring the time of reflection. When the monitor 411 is a sonic sensor, the monitor 411 is a sonar. The sonar emits sound waves and detects a distance to an object that reflects the sound waves. In this preferred embodiment, the monitor 411 may be any of the imager, the LiDAR unit (laser sensor), and the sonar, or any appropriate combination of the imager, the LiDAR unit (laser sensor), and the sonar mounted in the working vehicle 1, and is not limited.

The monitor 411 is attached to the working vehicle 1 to monitor regions in front of, on the sides of, and behind the working vehicle 1 (vehicle body 3). The monitoring direction of the monitor 411 is not limited.

As illustrated in FIG. 3, the working vehicle 1 includes a plurality of operation members (operation devices) 42. The operation members 42 include a shuttle lever 42a to change the movement direction of the vehicle body 3 between forward and reverse; an ignition switch 42b to, for example, start the prime mover 4; a PTO shift lever 42c to set the rotational speed of the PTO shaft; a transmission switch 42d to change between automatic transmission and manual transmission; a shift lever 42e to manually change the speed-change stage (speed-change level) of the transmission 5; an accelerator 42f to increase or decrease the vehicle speed; a quick raise/lower switch 42g to control a raising/lowering operation of the connector (raising/lowering device) 8; a height setting dial 42h to set an upper limit for the connector (raising/lowering device) 8; a vehicle speed lever 42i to set a vehicle speed; a hydraulic operation actuator 42j; and a rotation setting member 42k to set an upper limit of the rotational speed of the prime mover. The setting members including the transmission switch 42d, the height setting dial 42h, and the rotation setting member 42k are provided on a console box disposed on a side of the operator's seat 10. An operator operates the setting members (the transmission switch 42d, the height setting dial 42h, and the rotation setting member 42k) to set the movement of the vehicle body 3. The above-described operation members 42 are examples, and the operation members 42 are not limited to those described above.

As illustrated in FIG. 3, the working vehicle 1 includes a display 50. The display 50 displays various information regarding the working vehicle 1. The display 50 includes, for example, a liquid crystal panel or an organic EL panel, and a screen thereof may be switched and operated by operating hardware switches provided on the operator's seat 10 or the display 50. The display 50 may also have a screen that can be switched and operated by operating software switches displayed on the screen, and is not limited.

As illustrated in FIG. 3, the working vehicle 1 includes a controller 40 and a storage unit 45. The controller 40 is configured or programmed to control various operations of the working vehicle 1 and includes a CPU and electric and electronic circuits. The storage unit 45 is, for example, a non-volatile memory, and stores various information.

The controller 40 is configured or programmed to include a transmission control unit 40A, an engine control unit 40B, a PTO control unit 40C, a raising/lowering control unit 40D, an autonomous driving control unit 40E, an angle control unit 40F, and an auxiliary hydraulic control unit 40G.

The controller 40 and a controller 2a of the working device 2 are connected to an on-board network N1. In other words, the transmission control unit 40A, the engine control unit 40B, the PTO control unit 40C, the raising/lowering control unit 40D, the autonomous driving control unit 40E, the angle control unit 40F, the auxiliary hydraulic control unit 40G, and the controller 2a are connected to the on-board network N1.

It is not necessary that the controller 40 include all of the transmission control unit 40A, the engine control unit 40B, the PTO control unit 40C, the raising/lowering control unit 40D, the autonomous driving control unit 40E, the angle control unit 40F, and the auxiliary hydraulic control unit 40G, and the working vehicle 1 may be provided therewith as necessary depending on the specifications of the working vehicle 1. The transmission control unit 40A, the engine control unit 40B, the PTO control unit 40C, the raising/lowering control unit 40D, the autonomous driving control unit 40E, the angle control unit 40F, and the auxiliary hydraulic control unit 40G may be integrated in the controller 40.

The transmission control unit 40A performs transmission control. In transmission control, when an automatic transmission function is enabled, the main transmission unit 5c or the auxiliary transmission unit 5d is automatically switched depending on the conditions of the working vehicle 1, so that the speed-change stage (speed-change level) of the transmission 5 is automatically changed to a predetermined speed-change stage (speed-change level). In transmission control, when the transmission switch 42d is switched to manual transmission, the main transmission unit 5c or the auxiliary transmission unit 5d is automatically switched in accordance with a speed-change stage (speed-change level) set by the shift lever 42e, so that the speed-change stage of the transmission 5 is changed accordingly.

The transmission control unit 40A controls a driving state (movement) of the traveling device 7 (performs driving switching control). In driving switching control, when the shuttle lever 42a is operated to select forward movement, the forward/reverse switch 5b2 of the shuttle unit 5b is switched to forward so that the vehicle body 3 moves forward. In addition, in driving switching control, when the shuttle lever 42a is operated to select reverse movement, the forward/reverse switch 5b2 of the shuttle unit 5b is switched to reverse so that the vehicle body 3 moves backward.

In driving switching control, the first front transmission clutch 5f1 is set to the disconnected state and the second front transmission clutch 5f2 is set to the connected state in the 4WD mode. In driving switching control, the first front transmission clutch 5f1 is set to the connected state and the second front transmission clutch 5f2 is set to the disconnected state in the double-speed 4WD mode. In driving switching control, the first front transmission clutch 5f1 and the second front transmission clutch 5f2 are set to the connected state in the 2WD mode.

The engine control unit 40B performs engine control. In engine control, when the ignition switch 42b is turned on, predetermined processes are performed to start the prime mover 4. When the ignition switch 42b is turned off, the operation of the prime mover 4 is stopped. In engine control, when the accelerator 42f is operated, the vehicle speed (velocity) of the vehicle body 3 is changed by changing the rotational speed of the prime mover 4 (referred to as a prime-mover rotational speed) in accordance with the amount of operation of the accelerator 42f.

The PTO control unit 40C performs PTO control. In PTO control, when the PTO shift lever 42c is operated, the rotational speed of the PTO shaft (referred to as a PTO rotational speed) is changed by switching PTO transmission gears included in the transmission 5.

The raising/lowering control unit 40D performs raising/lowering control. In raising/lowering control, when a manual raising/lowering function is enabled and when the quick raise/lower switch 42g is operated in a raising direction, the control valve is controlled to extend the lift cylinders 8e so that rear end portions (end portions adjacent to the working device 2) of the lift arms 8a are raised. In raising/lowering control, when the manual raising/lowering function is enabled and when the quick raise/lower switch 42g is operated in a lowering direction, the control valve is controlled to contract the lift cylinders 8e so that the rear end portions (end portions adjacent to the working device 2) of the lift arms 8a are lowered. If the position of the working device 2, that is, the angle of the lift arms 8a reaches the upper limit (upper height limit) set by the height setting dial 42h while the working device 2 is being raised by the connector (raising/lowering device) 8, the connector (raising/lowering device) 8 stops raising the working device 2.

In raising/lowering control, when the vehicle body 3 moves backward while a backup function is enabled, the control valve is automatically controlled to extend the lift cylinders 8e so that the rear end portions (end portions adjacent to the working device 2) of the lift arms 8a are raised. In raising/lowering control, when the steering angle of the steering device 11 reaches or exceeds a predetermined angle while an automatic raising function is enabled, the control valve is automatically controlled to extend the lift cylinders 8e so that the rear end portions (end portions adjacent to the working device 2) of the lift arms 8a are raised.

The autonomous driving control unit 40E controls an autonomous driving operation. The autonomous driving control unit 40E is capable of controlling a line-based autonomous driving operation and an independent autonomous driving operation. In the line-based autonomous driving operation, the steering device 11, the transmission 5, and the prime mover 4, for example, are controlled so that the working vehicle 1 (vehicle body 3) moves along a preset scheduled traveling line. In the independent autonomous driving operation, the moving direction (steering direction) and the vehicle speed (velocity), for example, are set based on sensing results obtained by, for example, the monitor 411 that monitors the regions surrounding the working vehicle 1 (vehicle body 3). The steering device 11, the transmission 5, and the prime mover 4 are controlled to achieve the set steering direction and vehicle speed. The controlled operation may be switched between the line-based autonomous driving operation and the independent autonomous driving operation with, for example, a switch. The autonomous driving control unit 40E may be configured or programmed to control one of the line-based autonomous driving operation and the independent autonomous driving operation, and is not limited.

The angle control unit 40F performs angle control. When a positioning function (fixing function) is enabled, the angle control unit outputs a control signal to the control valve 25b (FIG. 2) so that the length of the changing cylinder 25a is fixed to a predetermined length. More specifically, the angle of the width direction of the working device 2 set by the angle changer 25 (angle of a straight line connecting the lower links 8b and 8b with respect to a horizontal direction) is fixed. When a horizontal function is enabled, the angle control unit outputs a control signal to the control valve 25b so that the changing cylinder 25a is extended or contracted to maintain the working device 2 set by the angle changer 25 in a horizontal position. When a tilting function is set, the angle control unit outputs a control signal to the control valve 25b so that the changing cylinder 25a is extended or contracted to maintain the working device 2 set by the angle changer 25 parallel to the surface of the agricultural field (ground).

The auxiliary hydraulic control unit 40G controls the auxiliary valves (operation control valves) 27 to which hydraulic hoses or the like are connected among the plurality of auxiliary valves 27. For example, when the hydraulic operation actuator 42j, such as a swingable lever, is operated, the auxiliary hydraulic control unit 40G switches a flow of hydraulic fluid output from a predetermined one of the auxiliary valves 27. For example, when the hydraulic operation actuator 42j is moved leftward, the auxiliary hydraulic control unit 40G energizes the solenoid of the predetermined auxiliary valve 27 to move the spool of the predetermined auxiliary valve 27 so that the direction in which the hydraulic fluid flows is set to one direction. When the hydraulic operation actuator 42j is moved rightward, the auxiliary hydraulic control unit 40G energizes the solenoid of the predetermined auxiliary valve 27 to move the spool of the predetermined auxiliary valve 27 so that the direction in which the hydraulic fluid flows is set to the other direction. Thus, the hydraulic attachments of the working device 2 can be operated by the auxiliary valves 27.

FIG. 4 illustrates the manner in which the working vehicle 1 is autonomously driven from an agricultural field A to an agricultural field B. Referring to FIG. 4, when the working vehicle 1 is to be autonomously driven from the agricultural field A to the agricultural field B, the display 50 displays a setting screen M1 to enable setting of a scheduled travel route L1 in response to a predetermined operation. The setting screen M1 includes a field section 110 in which an agricultural field map MP1 including agricultural fields K1 and roads K2 are displayed. The roads K2 include, for example, automobile roads, forest roads, and agricultural roads.

The operator, for example, may operate the display 50 to set the scheduled travel route L1 from the agricultural field A to the agricultural field B on the agricultural field map MP1 displayed in the field section 110. The agricultural fields K1 and the roads K2 are associated with position information (latitude and longitude) on the agricultural field map MP1, and the scheduled travel route L1 is also associated with position information when the scheduled travel route L1 is set. When the scheduled travel route L1 is set as described above, the autonomous driving control unit 40E controls a line-based autonomous driving operation to drive the working vehicle 1 along the scheduled travel route L1.

In the above-described preferred embodiment, the operator, for example, operates the display 50 to set the scheduled travel route L1. However, the display 50 may automatically set the scheduled travel route L1 when the agricultural field A is selected as the starting location and the agricultural field B is selected as the destination on the setting screen M1.

Alternatively, the agricultural field A may be selected as the starting location and the agricultural field B may be set as the destination on the setting screen M1 without the scheduled travel route L1 associated with the position information being set. When the scheduled travel route L1 is not set (when the agricultural field A is simply set as the starting location and the agricultural field B as the destination) as described above, the autonomous driving control unit 40E controls an independent autonomous driving operation for driving the working vehicle 1 from the agricultural field A to the agricultural field B.

The working vehicle 1 acquires (detects) road conditions while being autonomously driven along a path from the agricultural field A to the agricultural field B. Referring to FIGS. 5A and 5B, examples of the road conditions include an inclination (gradient) θ1 of the road K2, a condition of irregular portions 101 on the road K2, presence or absence of pavement on the road K2, a width W11 of a structure 102 on the road K2, a height H1 of the structure 102, a width W5 of the road K2, a size R1 of a curve of the road K2, and a condition of an intersection R2. The structure 102 is, for example, a utility pole, a signal, a road sign, a gutter, a signboard, a gate, a street lamp, a pedestrian crossover bridge, a pier, a pole, a guardrail, a fence, or a sidewalk. More specifically, as illustrated in FIG. 5A, the monitor 411 detects the inclination θ1 of the road K2 in front of the working vehicle 1 in the moving direction based on, for example, an image of a region in front of the working vehicle 1 captured by the imager or scan data obtained by the LiDAR unit. Alternatively, the inertial measurement unit may detect the inclination θ1 of the road K2 along which the working vehicle 1 is being driven based on the pitch angle.

The monitor 411 also detects a width W10 of each irregular portion 101 in front of the working vehicle 1 in the moving direction, a length L10 of the irregular portion 101, a depth F10 of the irregular portion 101, and a position of the irregular portion 101 on the road K2 based on, for example, the captured image or the scan data. The monitor 411 detects presence or absence of pavement on the road K2 by analyzing the surface condition of the road K2 based on, for example, the captured image or the scan data.

The monitor 411 detects the width W11 of the structure 102 in front of the working vehicle 1 in the moving direction and the height H1 of the structure 102 based on, for example, the captured image or the scan data. The monitor 411 may have data of profile of the structure 102 (profile data) and determine the type of the structure 102 by performing a matching process in which the shape represented by the profile data is compared with the shape of the structure 102 extracted from the captured image or the scan data. The type of the structure 102 may also be determined by comparing features of the structure 102 extracted from the captured image or the scan data with features of the structure 102 based on the profile data.

Referring to FIG. 5B, the monitor 411 detects the width (road width) W5 of the road K2 in front of the working vehicle 1 in the moving direction, the size R1 of the curve of the road K2, and the intersection R2 of the road K2 based on, for example, the captured image or the scan data. With regard to the size R1 of the curve of the road K2 and the intersection R2 of the road K2, the controller 40, the display 50, etc., may refer to the agricultural field map MP1 and estimate the size R1 of the curve and the condition of the intersection R2 of the road K2 displayed on the agricultural field map MP1. The above-described method for detecting the road conditions is an example, and the method is not limited.

While being autonomously driven along the path from the agricultural field A to the agricultural field B, the working vehicle 1 acquires device conditions in which the working device 2 is connected to the working vehicle 1 (vehicle body 3).

Referring to FIG. 6, the device conditions are conditions in the autonomous driving operation along the road K2, and include conditions of the working vehicle 1 to which the working device 2 is connected (vehicle conditions) and conditions of the working device 2 connected to the working vehicle 1 (device conditions).

The vehicle conditions include a driving mode (2WD or 4WD) of the vehicle body 3, and also includes a vehicle-body height H11 of the vehicle body 3, a vehicle-body width W20 of the vehicle body 3, a weight ratio of the vehicle body 3, and a length L20 of the vehicle body 3, as illustrated in FIG. 6.

The controller 40 is capable of acquiring the driving mode of the vehicle body 3 based on whether the driving mode is set to 2WD or 4WD in driving switching control. The vehicle-body height H11 of the vehicle body 3 is a dimension from the front wheels 7F and the rear wheels 7R to a highest position, for example, a dimension from the front wheels 7F and the rear wheels 7R to a top plate of the cabin 9. The vehicle-body width W20 of the vehicle body 3 is a horizontal distance between a portion of the vehicle body 3 that protrudes furthest to the left and a portion of the vehicle body 3 that protrudes furthest to the right. The weight ratio of the vehicle body 3 is a ratio between the weights of portions in front of and behind the center of the vehicle body 3 in the front-rear direction when the working device 2 is connected to the vehicle body 3. The length L20 of the vehicle body 3 is a distance from the front end of the vehicle body 3 to the rear end of the vehicle body 3, that is, to the rear end of the connector (raising/lowering device) 8 (rear ends of the lower links 8b).

The vehicle-body height H11 of the vehicle body 3, the vehicle-body width W20 of the vehicle body 3, the weight ratio of the vehicle body 3, and the length L20 of the vehicle body 3 are stored in the controller 40 in advance as specification information, and can be acquired by the controller 40 by referring to the specification information. The length L20 of the vehicle body 3 may be corrected in accordance with the raising/lowering position of the connector (raising/lowering device) 8 because the position of the rear end of the connector (raising/lowering device) 8 (rear ends of the lower links 8b) changes when the connector (raising/lowering device) 8 is raised or lowered. The controller 40 may estimate the weight ratio of the vehicle body 3 based on the weight of the vehicle body 3, the weight of the working device 2, the length L20 of the vehicle body 3, and a length L30 (FIG. 7A) of the working device 2 described below.

Figure 7D:
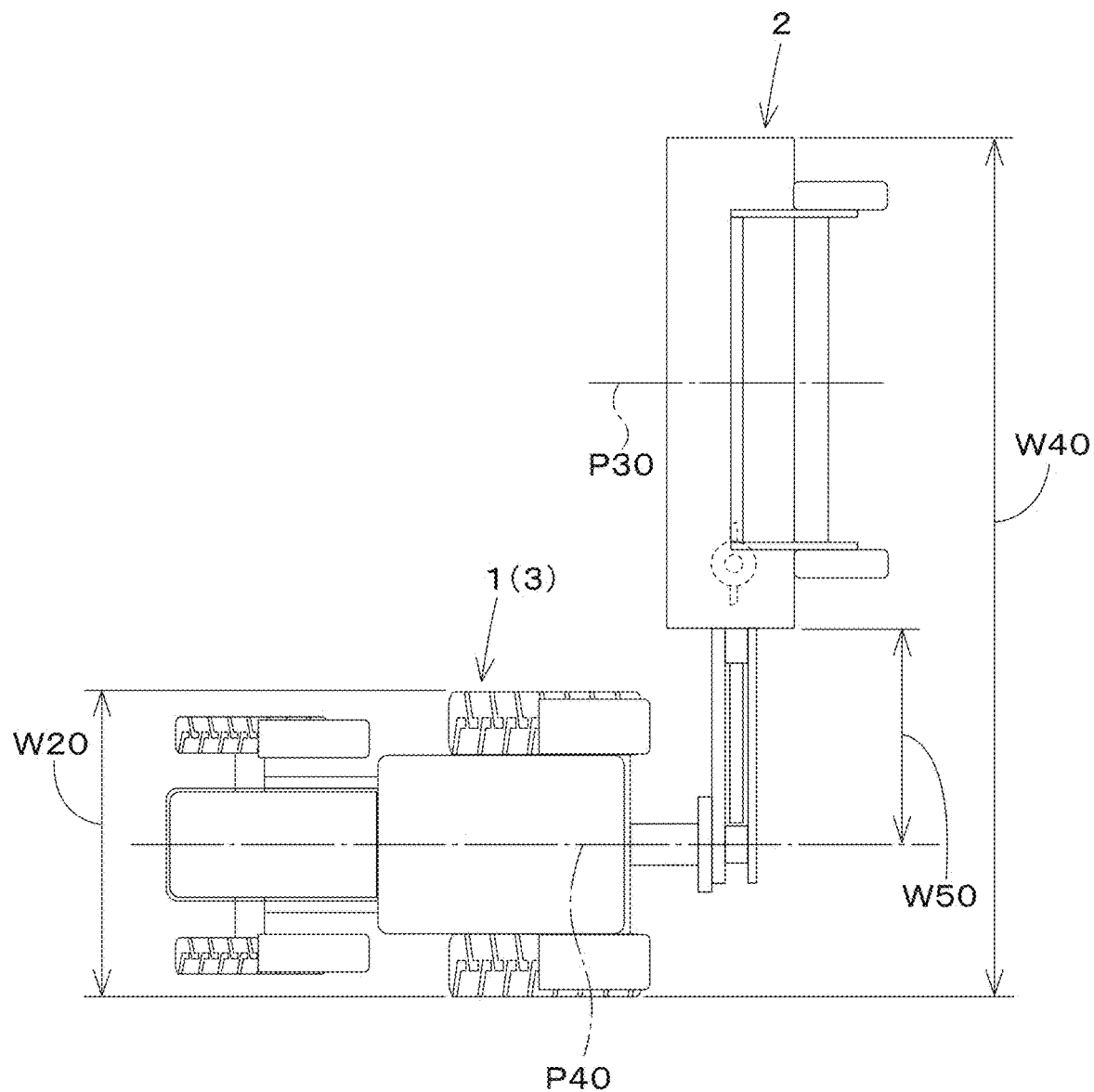
FIG. 7D illustrates an example in which the working device connected to the working vehicle is a mower.

FIG. 7A shows a side view and a plan view of the working vehicle 1 to which a cultivator is attached. FIG. 7B shows a side view and a plan view of the working vehicle 1 to which a spreader is attached. FIG. 7C shows a side view and a plan view of the working vehicle 1 to which a baler is attached. FIG. 7D is a plan view of the working vehicle 1 to which a mower is attached. The working devices illustrated in FIGS. 7A to 7D are examples, and are not limited.

Referring to FIGS. 7A to 7D, the device conditions include attachment heights H21 and H22 of the working device 2 in an attached state, an attachment width W30, an overall width W40, an offset width W50 of the working device 2, and the length L30 of the working device 2.

Referring to FIGS. 7A and 7B, when the working device 2 is connected to the working vehicle 1 in a state such that the working device 2 is raised by the connector (raising/lowering device) 8, that is, when the working device 2 is supported in a cantilever manner, the attachment height H21 is the vertical distance from the front wheels 7F and the rear wheels 7R to a highest portion of the working device 2. The attachment height H22 is the vertical distance from the front wheels 7F and the rear wheels 7R to a lowest portion of the working device 2.

Referring to FIG. 7C, when the working device 2 includes wheels in contact with the surface of the road K2, the attachment height H21 is a vertical distance from the front wheels 7F and the rear wheels 7R to a highest portion of the working device 2.

As illustrated in FIGS. 7A to 7D, the attachment width W30, which is a width of the working device 2, is the linear distance between a left end portion and a right end portion of the working device 2. Referring to FIG. 7A to 7C, when a center position P30 of the working device 2 in the width direction coincides with a center position P40 of the working vehicle 1 in the width direction (when the working device 2 is attached to the working vehicle 1 without being offset toward the left or right), the offset width W50 of the working device 2 is 0. Referring to FIG. 7D, when the center position P30 of the working device 2 in the width direction is displaced leftward or rightward from the center position P40 of the working vehicle 1 in the width direction, the offset width W50 of the working device 2 is the distance from the center position P40 of the working vehicle 1 in the width direction to an end portion of the working device 2 in the width direction.

Assuming that the working vehicle 1 and the working device 2 are integrated together when the working device 2 is connected to the working vehicle 1, the overall width W40 is a width of the working machine 100 including the working vehicle 1 and the working device 2. Referring to FIGS. 7A and 7B, when the working device 2 is attached to the working vehicle 1 without being offset and the attachment width W30 of the working device 2 is greater than the vehicle-body width W20 of the vehicle body 3, the overall width W40 is equal to the attachment width W30. Referring to FIG. 7C, when the working device 2 is attached to the working vehicle 1 without being offset and the attachment width W30 of the working device 2 is less than the vehicle-body width W20 of the vehicle body 3, the overall width W40 is equal to the vehicle-body width W20. Referring to FIG. 7D, when the working device 2 is attached to the working vehicle 1 with an offset, the overall width W40 is obtained by adding the offset width W50 and the attachment width W30.

As illustrated in FIGS. 7A to 7D, the length L30 of the working device 2 is the linear distance between the front end and the rear end of the working device 2.

As described above, the controller 40 is capable of acquiring the attachment heights H21 and H22, the attachment width W30, the overall width W40, the offset width W50, and the length L30 of the working device 2 by causing the display 50 to display an input screen M2 illustrated in FIG. 8 and receiving the attachment heights H21 and H22, the attachment width W30, the overall width W40, the offset width W50, and the length L30 of the working device 2 input on the input screen M2. Alternatively, a database containing specifications of the working device 2 may be stored in the storage unit 45, and the attachment heights H21 and H22, the attachment width W30, the overall width W40, the offset width W50, and the length L30 of the working device 2 may be read into the controller 40 from the database when the working device 2 is connected to the working vehicle 1. In this case, since the attachment heights H21 and H22 vary depending on the raising/lowering operation performed by the connector (raising/lowering device) 8, the attachment heights H21 and H22 may be corrected in response to the raising/lowering operation performed by the connector (raising/lowering device) 8.

As described above, the working vehicle 1 (controller 40) is capable of acquiring the road conditions and the device conditions while the working vehicle 1 is being autonomously driven along the road K2.

As illustrated in FIG. 3, the working vehicle 1 includes a driving estimation unit 51. The driving estimation unit 51 includes a CPU, electric and electronic circuits, and programs. The driving estimation unit 51 estimates whether the working vehicle 1 (vehicle body 3) is drivable along the road K2 based on the road conditions and the device conditions.

Referring to FIG. 4, when the working vehicle 1 is autonomously driven from the agricultural field A to the agricultural field B, the driving estimation unit 51 refers to the road conditions acquired by the working vehicle 1 (controller 40) during the autonomous driving operation. The road conditions include the inclination (gradient) 01 of the road K2, the condition of the irregular portion 101, presence or absence of pavement on the road K2, the width W11 and the height H1 of the structure 102, the width W5 of the road K2, the size R1 of the curve of the road K2, and the condition of the intersection R2. The driving estimation unit 51 also refers to the conditions of the working vehicle 1 and the device conditions during the autonomous driving operation. The conditions of the working vehicle 1 include the driving mode (2WD or 4WD) of the vehicle body 3, the vehicle-body height H11, the vehicle-body width W20, the weight ratio, and the length L20 of the vehicle body 3. The device conditions include the attachment heights H21 and H22, the attachment width W30, the overall width W40, the offset width W50 of the working device 2, and the length L30 of the working device 2.

The driving estimation unit 51 estimates whether the vehicle body 3 is drivable along the road K2 based on the road conditions and the attachment conditions (vehicle conditions and device conditions). The controller 40 (autonomous driving control unit 40E) controls the autonomous driving operation based on the result of the estimation (estimation result).

The driving estimation unit 51 and the autonomous driving control unit 40E will now be described in detail.

Referring to FIG. 5A, when a slope is detected in front of the working vehicle 1 while the working vehicle 1 is being autonomously driven along the road K2, the driving estimation unit 51 refers to the inclination θ1 of the slope. When the slope of the road K2 is steep and has an inclination (road inclination) θ1 of greater than or equal to a threshold (first threshold) and when the driving mode of the vehicle body 3 is 2WD in which the driving force (propelling force) is less than that in 4WD, the driving estimation unit 51 estimates that the vehicle body 3 is undrivable. When the driving estimation unit 51 estimates that the vehicle body 3 is undrivable, for example, the autonomous driving control unit 40E stops the autonomous driving operation before the vehicle body 3 reaches the slope.

When the driving mode of the vehicle body 3 is 4WD in which a large driving force (propelling force) is exerted, the driving estimation unit 51 estimates that the vehicle body 3 is drivable even when the road K2 has a slope with an inclination θ1 of greater than or equal to the first threshold. When the driving estimation unit 51 estimates that the vehicle body 3 is drivable, the autonomous driving control unit 40E continues to control the autonomous driving operation.

In addition, when the working vehicle 1 is driven along an upward slope, the driving estimation unit 51 refers to the weight ratio of the working vehicle 1 and estimates an inclination of the road K2 along which the working vehicle 1 is drivable (driving inclination θ2) based on the weight ratio. When the estimated driving inclination θ2 is less than the inclination of the road K2 along which the working vehicle 1 is actually driven (road inclination θ1), the driving estimation unit 51 estimates that the working vehicle 1 is undrivable, and control of the autonomous driving operation is stopped. When the driving inclination θ2 is greater than or equal to the road inclination θ1, the driving estimation unit 51 estimates that the working vehicle 1 is drivable, and control of the autonomous driving operation is continued.

Figure 9A:
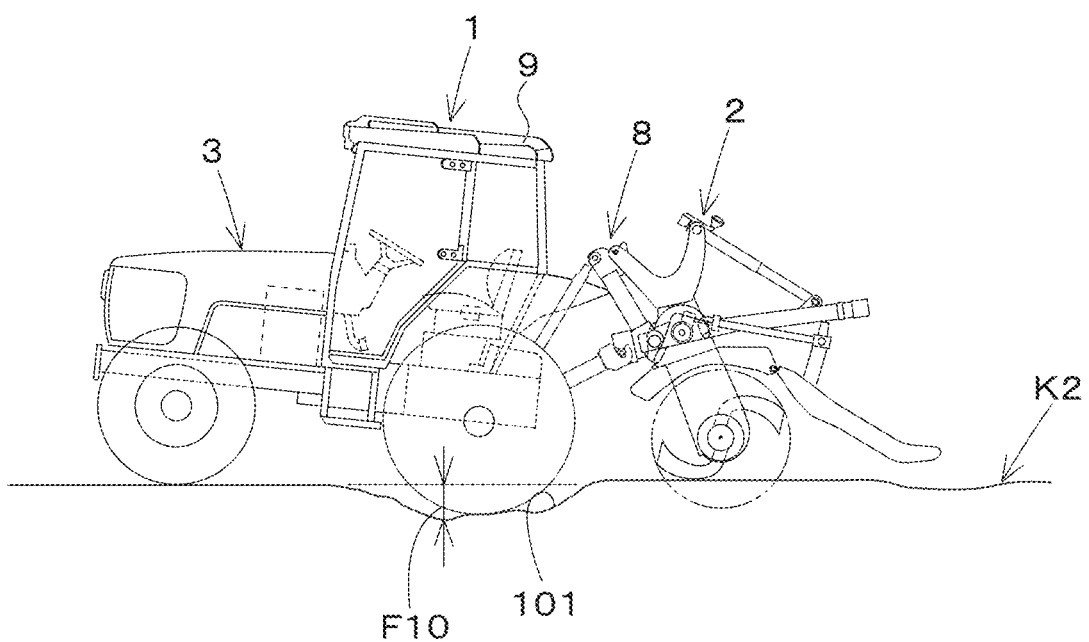
FIG. 9A illustrates a case in which the working vehicle is on an irregular portion of a road.

Referring to FIG. 9A, when the irregular portion 101 is present in front of the vehicle body 3, there may be a possibility that the entirety of the vehicle body 3 will move downward as the rear wheels 7R pass the irregular portion 101 and the bottom end of the working device 2 will come into contact with the surface of the road K2. In such a case, the driving estimation unit 51 estimates that the vehicle body 3 is undrivable. More specifically, referring to FIGS. 5A and 9A, the driving estimation unit 51 estimates whether the rear wheels 7R will fall into the irregular portion 101 based on the width W10 of the irregular portion 101, the length L10 of the irregular portion 101, and the depth F10 of the irregular portion 101. For example, when the width W10 of the irregular portion 101 is greater than the tread width of the rear wheels 7R and when the length L10 of the irregular portion 101 is greater than the outer wheel diameter of the rear wheels 7R, the driving estimation unit 51 estimates that at least one of the rear wheels 7R will fall into the irregular portion 101. When it is estimated that at least one of the rear wheels 7R will fall into the irregular portion 101, the driving estimation unit 51 compares the depth F10 of the irregular portion 101 and the attachment height H22. When the depth F10 of the irregular portion 101 is greater than the attachment height H22 (F10>H22), or when the attachment height H22 is greater than the depth F10 of the irregular portion 101 (H22>F10) but the difference between the attachment height H22 and the depth F10 of the irregular portion 101 (H22−F10) is less than or equal to a second threshold, the driving estimation unit 51 estimates that the vehicle body 3 is undrivable. When the driving estimation unit 51 estimates that the vehicle body 3 is undrivable, the autonomous driving control unit 40E stops the autonomous driving operation before the vehicle body 3 reaches the irregular portion 101. When the attachment height H22 is greater than the depth F10 of the irregular portion 101 (H22>F10) and when the difference between the attachment height H22 and the depth F10 of the irregular portion 101 (H22−F1) is greater than the second threshold, the bottom end of the working device 2 does not come into contact with the road K2 even when the rear wheels 7R fall into the irregular portion 101. Therefore, the driving estimation unit 51 estimates that the vehicle body 3 is drivable, and the autonomous driving control unit 40E continues to control the autonomous driving operation.

When the width W10 of the irregular portion 101 is less than the tread width of the rear wheels 7R, the rear wheels 7R do not fall into the irregular portion 101. Therefore, the driving estimation unit 51 estimates that the vehicle body 3 is drivable, and the autonomous driving control unit 40E continues to control the autonomous driving operation.

Figure 9B:
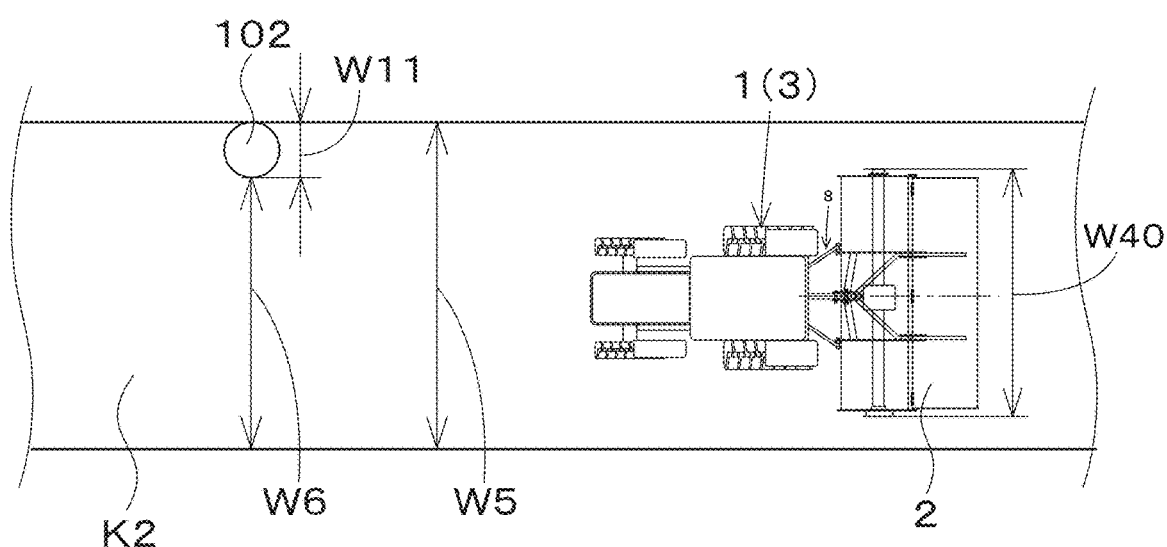
FIG. 9B illustrates a case in which a structure is placed on a road in front of the working vehicle.

Referring to FIG. 9B, when the structure 102 is present in front of the vehicle body 3, the driving estimation unit 51 calculates a road width W6 at the location of the structure 102 (road width W6=road width W5−width W11 of structure 102) and the overall width W40. When the overall width W40 is greater than the road width W6 (W40>W6), or when the difference between the road width W6 and the overall width W40 (W6−W40) is less than or equal to a third threshold, the driving estimation unit 51 estimates that the vehicle body 3 is undrivable, and the autonomous driving control unit 40E stops controlling the autonomous driving operation before the vehicle body 3 reaches the structure 102.

When the overall width W40 is less than the road width W6 and when the difference between the overall width W40 and the road width W6 is greater than the third threshold (W6−W40>third threshold), the driving estimation unit 51 estimates that the vehicle body 3 is drivable, and the autonomous driving control unit 40E continues to control the autonomous driving operation.

Figure 9C:
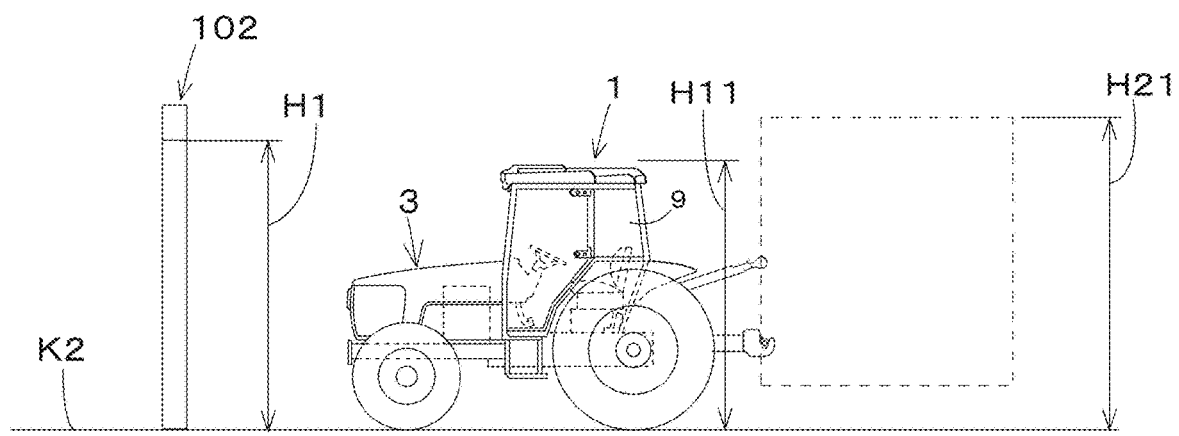
FIG. 9C illustrates a case in which the working vehicle passes under a structure.

Referring to FIG. 9C, when the structure 102 is present in front of the vehicle body 3 and the structure 102 is a structure disposed above the road K2 (e.g., a gate, a street lamp, a pedestrian crossover bridge, a pier, or a signboard), the driving estimation unit 51 compares the height H1 at which the structure 102 is positioned and the vehicle-body height H11 and also compares the height H1 and the attachment height H21. When the vehicle-body height H11 is greater than the height H1 of the structure 102 (H1<H11), or when the attachment height H21 is greater than the height H1 of the structure 102 (H1<H21), the driving estimation unit 51 estimates that the vehicle body 3 is undrivable, and the autonomous driving control unit 40E stops controlling the autonomous driving operation before the vehicle body 3 reaches the structure 102.

In addition, when the vehicle-body height H11 is less than the height H1 of the structure 102 but the difference between the height H1 of the structure 102 and the vehicle-body height H11 (H1−H11) is less than or equal to a fourth threshold, or when the attachment height H21 is less than the height H1 of the structure 102 but the difference between the height H1 of the structure 102 and the attachment height H21 (H1−H21) is less than or equal to the fourth threshold, the driving estimation unit 51 estimates that the vehicle body 3 is undrivable, and the autonomous driving control unit 40E stops controlling the autonomous driving operation before the vehicle body 3 reaches the structure 102.

When the vehicle-body height H11 is less than the height H1 of the structure 102 and the difference between the height H1 of the structure 102 and the vehicle-body height H11 (H1−H11) is greater than the fourth threshold, and when the attachment height H21 is less than the height H1 of the structure 102 and the difference between the height H1 of the structure 102 and the attachment height H21 (H1−H21) is greater than the fourth threshold, the driving estimation unit 51 estimates that the vehicle body 3 is drivable, and the autonomous driving control unit 40E continues to control the autonomous driving operation.

Figure 9D:
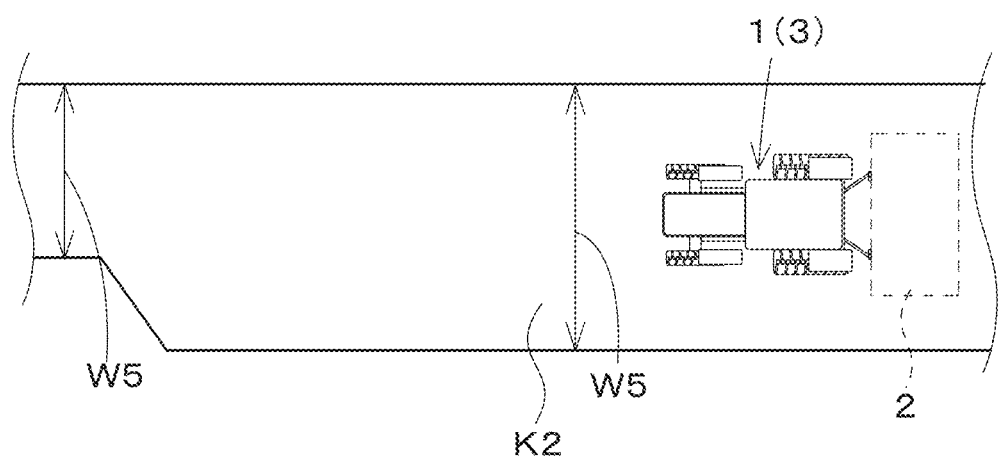
FIG. 9D illustrates a case in which the road in front of the working vehicle is narrow.

Referring to FIG. 9D, when the road width W5 of the road K2 changes in front of the vehicle body 3, the driving estimation unit 51 compares the road width W5 and the vehicle-body width W20. When the road width W5 is less than the vehicle-body width W20 (W5<W20), or when the road width W5 is greater than the vehicle-body width W20 but the difference between the road width W5 and the vehicle-body width W20 (W5−W20) is less than or equal to a fifth threshold, the driving estimation unit 51 estimates that the vehicle body 3 is undrivable, and the autonomous driving control unit 40E stops controlling the autonomous driving operation before the vehicle body 3 reaches a location at which the road width W5 decreases.

When the road width W5 is greater than the vehicle-body width W20 and the difference between the road width W5 and the vehicle-body width W20 (W5−W20) is greater than the fifth threshold, the driving estimation unit 51 estimates that the vehicle body 3 is drivable, and the autonomous driving control unit 40E continues to control the autonomous driving operation.

When the overall width W40 is greater than the vehicle-body width W20 (W40>W20), the driving estimation unit 51 compares the road width W5 and the overall width W40. When the overall width W40 is greater than the road width W5 (W5<W40), or when the road width W5 is greater than the overall width W40 but the difference between the road width W5 and the overall width W40 (W5−W40) is less than or equal to the fifth threshold, the driving estimation unit 51 estimates that the vehicle body 3 is undrivable, and the autonomous driving control unit 40E stops controlling the autonomous driving operation before the vehicle body 3 reaches the location at which the road width W5 decreases. When the overall width W40 is less than the road width W5 and the difference between the road width W5 and the overall width W40 (W5−W40) is greater than the fifth threshold, the driving estimation unit 51 estimates that the vehicle body 3 is drivable, and the autonomous driving control unit 40E continues to control the autonomous driving operation.

Figure 9E:
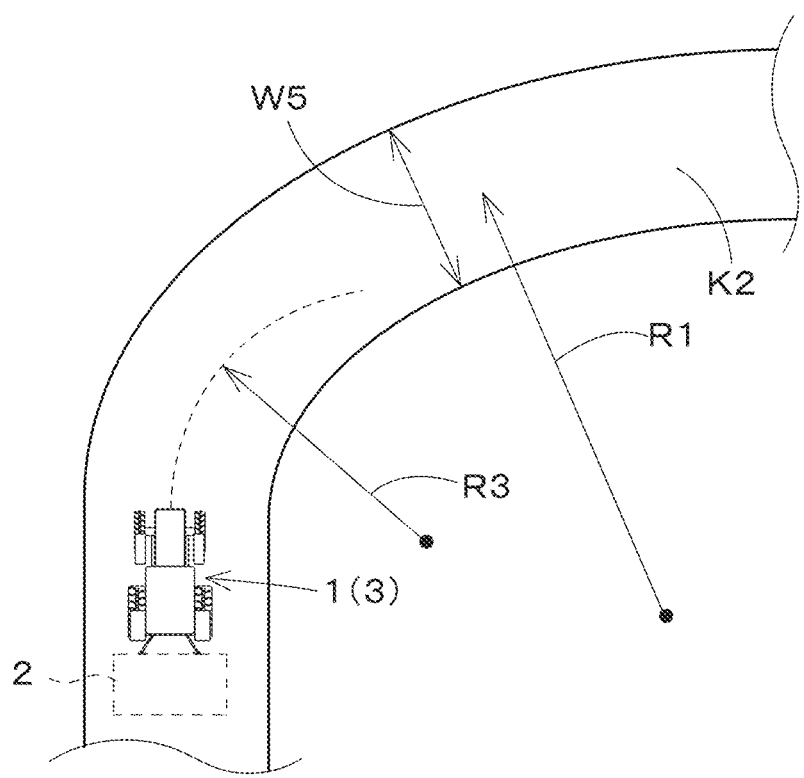
FIG. 9E illustrates a case in which the road in front of the working vehicle is curved.

Referring to FIG. 9E, when the road K2 is curved in front of the vehicle body 3, the driving estimation unit 51 estimates whether the vehicle body 3 is capable of traveling along the curve. For example, the driving estimation unit 51 calculates the sum of the length L20 of the vehicle body 3 and the length L30 of the working device 2 to determine an overall length L40 of the working machine 100 (L40=L20+L30). The driving estimation unit 51 also calculates a minimum turning radius R3 from the overall length L40 of the working machine 100 and the largest steering angle (maximum steering angle) of the steering device 11. The driving estimation unit 51 compares the size R1 of the curve, that is, the radius R1 of the curve and the minimum turning radius R3. When the radius R1 of the curve is less than the minimum turning radius R3 (R1<R3), or when the radius R1 of the curve is greater than the minimum turning radius R3 but the difference between the radius R1 and the radius R3 (R1−R3) is less than or equal to a sixth threshold, the driving estimation unit 51 estimates that the vehicle body 3 is undrivable, and the autonomous driving control unit 40E stops controlling the autonomous driving operation before the vehicle body 3 reaches the curve.

When the radius R1 of the curve is greater than the minimum turning radius R3 and the difference between the radius R1 and the radius R3 (R1−R3) is greater than the sixth threshold, it is estimated that the vehicle body 3 is drivable, and the autonomous driving control unit 40E continues to control the autonomous driving operation.

Figure 9F:
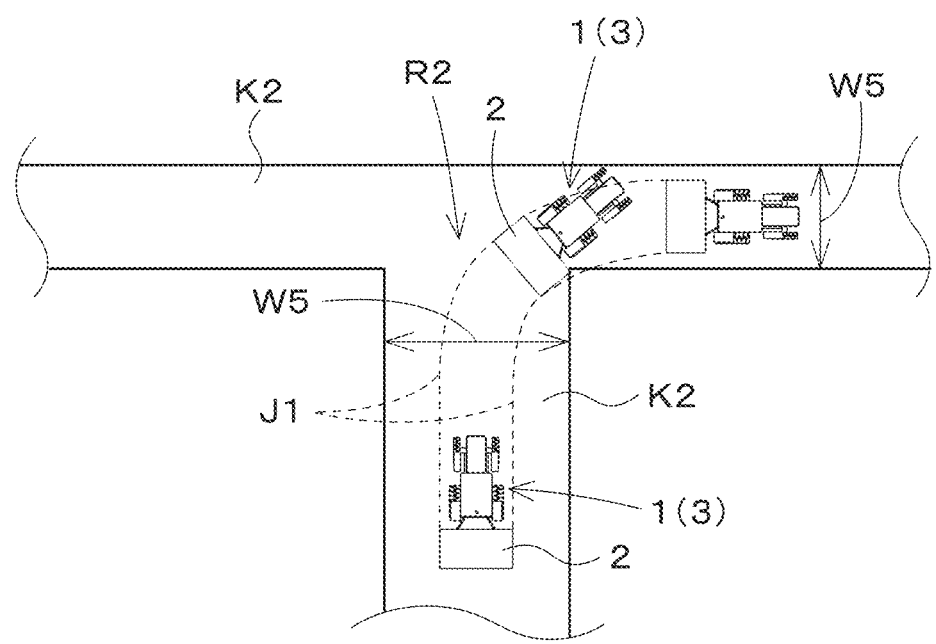
FIG. 9F illustrates a case in which the road in front of the working vehicle has an intersection.

Referring to FIG. 9F, when the road K2 has the intersection R2 in front of the vehicle body 3, the driving estimation unit 51 estimates whether the vehicle body 3 is capable of turning the intersection R2. The driving estimation unit 51 calculates a path J1 along which the vehicle body 3 approaches and turns the intersection R2 based on the overall length L40 of the working machine 100, the largest steering angle (maximum steering angle) of the steering device 11, and the overall width W40. When the path J1 for causing the vehicle body 3 and the working device 2 to turn left or right has a portion that protrudes from the road K2, or when a gap between the path J1 and an end portion of the road K2 is less than or equal to a seventh threshold, the driving estimation unit 51 estimates that the vehicle body 3 is undrivable, and the autonomous driving control unit 40E stops controlling the autonomous driving operation before the vehicle body 3 reaches the intersection R2.

When the gap between the path J1 and the end portion of the road K2 is greater than the seventh threshold, the driving estimation unit 51 estimates that the vehicle body 3 is drivable, and the autonomous driving control unit 40E continues to control the autonomous driving operation.

When the road K2 in front of the vehicle body 3 is not paved, the driving estimation unit 51 may estimate that the vehicle body 3 is undrivable, and the autonomous driving control unit 40E may stop controlling the autonomous driving operation before the vehicle body 3 reaches the road K2 that is not paved. When the road K2 in front of the vehicle body 3 is paved, the driving estimation unit 51 estimates that the vehicle body 3 is drivable, and the autonomous driving control unit 40E continues the autonomous driving operation.

When the vehicle body 3 is driven along an upward slope, the driving estimation unit 51 may estimate the driving inclination (inclination at which the vehicle body 3 is drivable) $\theta 2$ based on the weight ratio. When the driving inclination $\theta 2$ is less than the road inclination $\theta 1$ of the road K2, the driving estimation unit 51 may estimate that the vehicle body 3 is undrivable, and control of the autonomous driving operation may be stopped before the vehicle body 3 reaches the slope. When the driving inclination θ2 is greater than or equal to the road inclination θ1 of the road K2, the driving estimation unit 51 may estimate that the vehicle body 3 is drivable, and the autonomous driving control unit 40E continues the autonomous driving operation.

As illustrated in FIG. 3, the working machine 100 includes a communication device 55. The communication device 55 is a communication module that provides direct communication or indirect communication with an external device 56, and is capable of providing wireless communication in accordance with, for example, Wireless-Fidelity (Wi-Fi, registered trademark) based on the IEEE 802.11 family of standards, Bluetooth (registered trademark) low energy (BLE), low-power, wide-area (LPWA), or low-power wide-area network (LPWAN). The communication device 55 may also be capable of providing wireless communication through, for example, a mobile phone communication network or a data communication network.

The external device 56 is, for example, a personal computer, a smartphone, a tablet computer, a PDA, or a server. The communication device 55 transmits driving information to the external device 56. The driving information is obtained when the vehicle body 3 is driven after the driving estimation unit 51 has estimated whether the vehicle body 3 is drivable along the road, that is, when the autonomous driving operation of the vehicle body 3 is continued.

For example, when the driving estimation unit 51 estimates that the vehicle body 3 is drivable and when the automatic traveling operation is continued, the communication device 55 transmits the captured image or the scan data obtained by the monitor 411 as the driving information. More specifically, the communication device 55 transmits the captured image or the scan data including the conditions of the road K2 (the irregular portion 101 on the road K2, the pavement of the road K2, the structure 102 on the road K2, the curve, and the intersection) to the external device 56 during the autonomous driving operation performed by the autonomous driving control unit 40E.

The communication device 55 may also transmit the driving mode (2WD or 4WD) of the vehicle body 3 during the autonomous driving operation, the vehicle-body height H11, the vehicle-body width W20, the weight ratio of the vehicle body 3, the length L20 of the vehicle body 3, the attachment heights H21 and H22, the attachment width W30, the overall width W40, the offset width W50, and the length L30 of the working device 2 to the external device 56 as driving conditions.

As illustrated in FIG. 3, the external device 56 includes a display 57. The display 57 is capable of displaying the driving information transmitted from the working vehicle 1 (vehicle body 3). When a predetermined operation is performed on the external device 56, the display 57 displays a driving screen M3 illustrated in FIG. 10. The driving screen M3 includes an image display section 91 and a driving display section 92.

The image display section 91 displays an image (driving image) in which the captured image or the scan data obtained by the monitor 411 is visualized. The driving display section 92 displays the conditions of the working vehicle 1 (the driving mode (2WD or 4WD) of the vehicle body 3, the vehicle-body height H11, the vehicle-body width W20, the weight ratio, and the length L20 of the vehicle body 3) and the device conditions (the attachment heights H21 and H22, the attachment width W30, the overall width W40, the offset width W50 of the working device 2, and the length L30 of the working device 2). Thus, conditions of the autonomous driving operation performed under the control of the controller 40 (autonomous driving control unit 40E) can be monitored by the external device 56.

When the driving estimation unit 51 estimates that the vehicle body 3 is not drivable (undrivable), the communication device 55 transmits a request for a driving operation under remote control (driving request) and the result of the estimation to the external device 56. When the external device 56 receives the driving request from the working vehicle 1 (communication device 55), the external device 56 causes the display 57, for example, to present a notice that the driving request has been issued. In addition, when the driving request is issued, the external device 56 displays the result of the estimation by the driving estimation unit 51 that the vehicle body 3 is undrivable.

Figure 11:
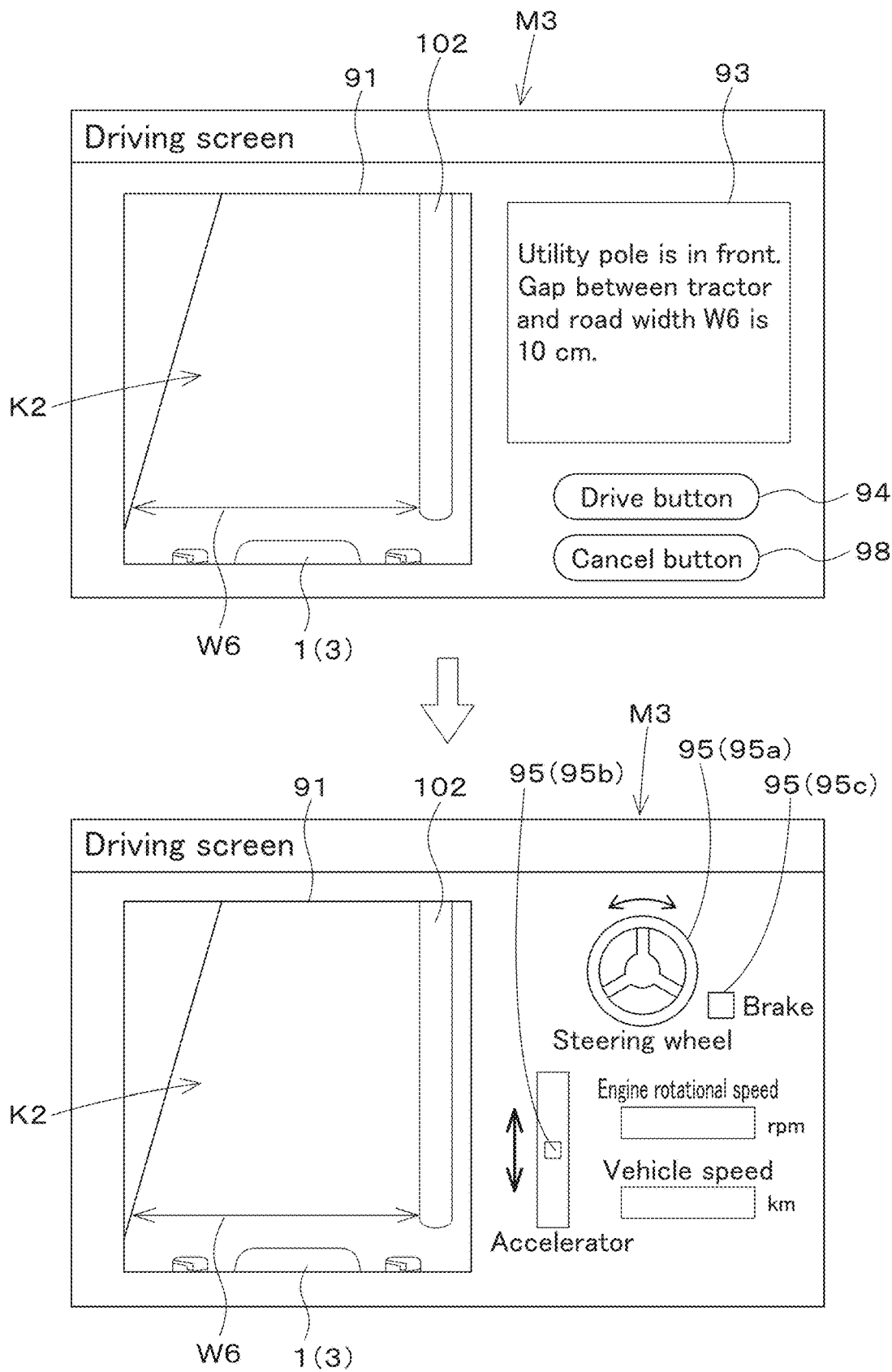
FIG. 11 illustrates another example of the driving screen.

Referring to FIG. 11, when the driving request is received, the display 57 displays the driving image in the image display section 91 of the driving screen M3 while the autonomous driving operation is stopped. The display 57 also displays the result of the estimation in a message section 93 of the driving screen M3. When a drive button 94 is selected on the driving screen M3, the driving screen M3 is changed so that graphic symbols of driving devices 95 connected to the external device 56 are displayed on the driving screen M3. The graphic symbols of the driving devices 95 include a graphic symbol 95*a* representing a steering wheel, a graphic symbol 95*b* representing an accelerator, and a graphic symbol 95*c* representing a brake. The graphic symbols 95*a*, 95*b*, and 95*c* correspond to the driving devices 95. When the steering wheel, which is one of the driving devices 95, is operated, the graphic symbol 95*a* rotates in a steering direction in accordance with the operation of the steering wheel. When the accelerator, which is another one of the driving devices 95, is operated, a portion of the graphic symbol 95*b* corresponding to the accelerator moves on the screen in accordance with the operation of the accelerator. When the brake, which is another one of the driving devices 95, is operated, the display state of the graphic symbol 95*c* changes between a braking state and a non-braking state in accordance with the operation of the brake. Driving commands for the operations of the driving devices 95 (steering angle of the steering wheel, operation input of the accelerator, and operation of the brake) are transmitted from the external device 56 to the communication device 55. The controller 40 drives the vehicle body 3 by controlling the prime mover 4, the steering device 11, the braking device, etc., in accordance with the remote driving operation, that is, the driving commands received by the communication device 55 from the external device 56.

Thus, the external device 56 and the working vehicle 1 communicate with each other through the communication device 55 so that the external device 56 is enabled to remotely control the working vehicle 1 (remote control). In other words, the controller 40 (autonomous driving control unit 40E) is capable of controlling the autonomous driving operation of the working vehicle 1 in accordance with the driving commands for operations transmitted from the external device 56.

When it is estimated that the vehicle body 3 is not drivable (undrivable) and when the autonomous driving control unit 40E (controller 40) stops the autonomous driving operation, the communication device 55 may transmit a request for cancellation of stoppage of the autonomous driving operation (cancelling request) to the external device 56. When the external device 56 receives the cancelling request from the working vehicle 1 (communication device 55), the external device 56 causes the display 57, for example, to present a notice that the cancelling request has been issued. As illustrated in FIG. 11, when the cancelling request is issued, the external device 56 displays the result of the estimation by the driving estimation unit 51 that the vehicle body 3 is undrivable in the message section 93 of the driving screen M3.

When a cancel button 98 is selected on the driving screen M3, the external device 56 transmits a command to cancel the stoppage of the autonomous driving operation (cancel command) to the communication device 55.

When the communication device 55 receives the command to cancel the stoppage of the driving operation (cancel command), the autonomous driving control unit 40E (controller 40) ignores, or discards, the result of the estimation by the driving estimation unit 51 that the vehicle body 3 is undrivable, and restarts to control the autonomous driving operation after the reception of the cancel command.

When it is estimated that the vehicle body 3 is not drivable (undrivable), the communication device 55 may transmit a request to change the device conditions to those that enable the vehicle body 3 to be driven (changing request) to the external device 56. The communication device 55 transmits the changing request to the external device 56 along with the device conditions based on which the vehicle body 3 has been estimated as being undrivable.

The external device 56 includes a setting unit 77 to set device conditions that enable the vehicle body 3 to be driven. The setting unit 77 includes the CPU, the electric and electronic circuits, and the programs provided in the external device 56. In response to the request for the device conditions received from the communication device 55, the setting unit 77 changes at least one of the device conditions of the vehicle body 3 and the working device 2 (first device condition) based on which the vehicle body 3 has been estimated as being undrivable to a device condition (second device condition) that enables the vehicle body 3 to be driven.

Referring to FIG. 12, when it is estimated that the vehicle body 3 is undrivable because the driving mode is 2WD (first device condition), the setting unit 77 changes the driving mode from 2WD (first device condition) to 4WD (second device condition) and transmits a command to change to the second device condition to the working vehicle 1 (communication device 55). In response to the change command, the controller 40 changes the driving mode of the working vehicle 1 to 4WD (second device condition).

When it is determined that the vehicle body 3 is not drivable along an upward slope, that is, undrivable, based on the weight ratio, the setting unit 77 transmits a command to change the weight ratio to the working vehicle 1 (communication device 55). In response to the change command, the controller 40 lowers the working device 2 to change the weight ratio, that is, to change the position of the center of gravity of the working vehicle 1, so that the driving inclination θ2 based on the weight ratio is changed.

When it is estimated that the vehicle body 3 is undrivable because the attachment height H22 (first device condition) is less than the depth F10 of the irregular portion 101 of the road K2, the setting unit 77 changes the attachment height H22 (first device condition) to a value greater than the depth F10 of the irregular portion 101 (second device condition) and transmits a command to change to the second device condition to the working vehicle 1 (communication device 55). In response to the change command, the controller 40 raises the connector (raising/lowering device) 8 to satisfy the following expression: attachment height H22>depth F10.

When it is estimated that the vehicle body 3 is undrivable because the attachment height H22 (first device condition) is greater than the depth F10 of the irregular portion 101 of the road K2 but the difference between the attachment height H22 and the depth F10 of the irregular portion 101 is less than the threshold, the setting unit 77 changes the attachment height H22 to a value (second device condition) such that the difference between the attachment height H22 and the depth F10 of the irregular portion 101 is greater than the threshold. The setting unit 77 transmits a command to change to the second device condition to the working vehicle 1 (communication device 55). In response to the change command, the controller 40 raises the connector (raising/lowering device) 8 to satisfy the following expression: "attachment height H22−depth F10 of irregular portion 101>threshold".

When it is estimated that the vehicle body 3 is undrivable because the attachment height H21 (first device condition) is less than the height H1 of the structure 102 but the difference between the height H1 of the structure 102 and the attachment height H21 is less than the threshold, the setting unit 77 changes the attachment height H21 to a value (second device condition) such that the difference between the height H1 of the structure 102 and the attachment height H21 is greater than or equal to the threshold. The setting unit 77 transmits a command to change to the second device condition to the working vehicle 1 (communication device 55). In response to the change command, the controller 40 lowers the connector (raising/lowering device) 8 to satisfy the following expression: "Height H1 of Structure 102−Attachment Height H21≥ Threshold".

When the driving estimation unit 51 estimates that the vehicle body 3 is not drivable (undrivable), the communication device 55 may transmit the thresholds (first to seventh thresholds) based on which the vehicle body 3 has been estimated as being undrivable to the external device 56. The external device 56 includes a correction unit 78 that corrects the thresholds to those with which the vehicle body 3 is drivable. The correction unit 78 includes the CPU, the electric and electronic circuits, and the programs provided in the external device 56.

FIG. 13A illustrates examples of the first to seventh thresholds. Referring to FIG. 13A, the first to seventh thresholds before correction by the correction unit 78 are stored in the controller 40 or the driving estimation unit 51 as default values. The correction unit 78 corrects the first to seventh thresholds.

More specifically, when a predetermined operation is performed on the external device 56, as illustrated in FIG. 13B, the external device 56 causes the display 57 to display a setting screen M4 to change the first to seventh thresholds. The setting screen M4 shows the preset default values set in advance in the working machine 100 (the working vehicle 1 and the working device 2). The first to seventh thresholds can be corrected by inputting corrected values in input sections 99 displayed next to the default values. The corrected values of the first to seventh thresholds are transmitted from the external device 56 to the communication device 55. When the communication device 55 receives the corrected values of the first to seventh thresholds, whether the vehicle body 3 is drivable along the road K2 is estimated based on the corrected values of the first to seventh thresholds.

The working machine 100 includes the vehicle body 3 to which the working device 2 is connectable; the driving estimation unit 51 that estimates whether the vehicle body 3 is drivable along the road K2 based on a road condition that is a condition of the road K2 along which the vehicle body 3 is driven and a device condition in which the working device 2 is connected to the vehicle body 3; the controller 40 that controls a driving operation of the vehicle body 3 based on an estimation result obtained as a result of the estimation by the driving estimation unit 51; and the communication device 55 that transmits driving information regarding the driving operation of the vehicle body 3 under control of the controller 40 to the external device 56. The controller 40 drives the vehicle body 3 based on a command received from the external device 56 after transmission of the driving information by the communication device 55.

Accordingly, when the working machine 100 travels along the road K2, the conditions in which the working machine 100 drives the vehicle body 3 can be monitored by the external device 56 based on the driving information, and the working machine 100 can be driven along the road K2 based on a command from the external device 56. In other words, the working machine transmits the driving information, which represent the conditions in which the working machine 100 is driven along the road K2 under its own control, to the external device 56 provided at a remote location, and is also capable of being driven in accordance with a command from the external device 56 when the command is transmitted from the external device 56. In particular, the working machine 100 can be readily driven along the road K2 outside an agricultural field.

When the command received after the controller 40 has stopped the driving operation based on the estimation result is to cancel stoppage of the driving operation, the controller 40 cancels the stoppage and restarts the driving operation. Accordingly, even when the driving operation is stopped by the driving estimation unit 51 and the controller 40 included in the working machine 100, the driving operation along the road K2 can be restarted (continued) in response to the command to cancel the stoppage of the driving operation from the external device 56.

When the command received after the controller 40 has stopped the driving operation based on the estimation result is an instruction of the driving operation under remote control, the controller 40 restarts the driving operation based on the instruction of the driving operation under remote control. Accordingly, even when the driving operation is stopped by the driving estimation unit 51 and the controller 40 included in the working machine 100, the driving operation along the road K2 can be restarted (continued) under remote control by the external device 56.

The communication device 55 transmits a threshold for one of the road condition and the device condition based on which the driving estimation unit 51 has estimated that the vehicle body 3 is not drivable to the external device 56. When the communication device 55 receives a corrected threshold, the driving estimation unit 51 estimates whether the vehicle body 3 is drivable along the road K2 based on the corrected threshold. Accordingly, when the driving operation is stopped based on the estimation result obtained by the driving estimation unit 51 included in the working machine 100, the threshold (threshold for one of the road condition and the device condition) based on which it has been determined that the driving operation is to be stopped can be checked by the external device 56. In addition, the threshold can be corrected by the external device 56, so that the driving operation can be restarted based on the corrected threshold.

The working machine 100 includes the vehicle body 3 to which the working device 2 is connectable; the driving estimation unit 51 that estimates whether the vehicle body 3 is drivable along the road K2 based on a road condition that is a condition of the road K2 along which the vehicle body 3 is driven and a device condition in which the working device 2 is connected to the vehicle body 3; and the controller 40 that controls a driving operation of the vehicle body 3 based on an estimation result obtained as a result of the estimation by the driving estimation unit 51. Accordingly, when, for example, the working machine 100 travels from one working field, such as an agricultural field, to another working field along the road K2, the working machine 100 can be driven with reference to the road condition and the device condition. In particular, the working machine 100 can be readily driven along the road K2 outside the agricultural field.

The driving estimation unit 51 acquires at least one of the driving mode of the vehicle body 3, the vehicle-body height H11 of the vehicle body 3, the vehicle-body width W20 of the vehicle body 3, the weight ratio of the vehicle body 3, and the length L20 of the vehicle body 3 as the device condition, and estimates whether the vehicle body 3 is drivable along the road K2 based on the acquired device condition and the road condition. The driving mode of the vehicle body 3, the vehicle-body height H11, the vehicle-body width W20, the weight ratio of the vehicle body 3, and the length L20 of the vehicle body 3 are highly correlated with the driving operation along the road K2. Accordingly, the vehicle body 3 can be driven more appropriately by acquiring the above-mentioned conditions.

The driving estimation unit 51 acquires at least one of the attachment heights H21 and H22 of the working device 2 in an attached state, the attachment width W30, the overall width W40, the offset width W50 of the working device 2 with respect to the vehicle body 3, and the length L30 of the working device 2 as the device condition, and estimates whether the vehicle body 3 is drivable along the road K2 based on the acquired device condition and the road condition. Accordingly, by performing the estimation regarding the driving operation while acquiring the attachment heights H21 and H22, the attachment width W30, the overall width W40, the offset width W50 of the working device 2 with respect to the vehicle body 3, and the length L30 of the working device 2, which further reflect the conditions of the working device 2, the vehicle body 3 can be more efficiently driven along the road K2 even when the working device 2 is connected to the working vehicle 1.

The driving estimation unit 51 acquires at least one of the inclination of the road K2, the condition of the irregular portion 101 of the road K2, presence or absence of pavement on the road K2, the width W11 of the structure 102 on the road K2, the height H1 of the structure 102, the width W5 of the road K2, the size R1 of the curve of the road K2, and the condition of the intersection R2 of the road K2 as the road condition, and estimates whether the vehicle body 3 is drivable along the road K2 based on the acquired road condition and the device condition. Accordingly, by performing the estimation regarding the driving operation while acquiring the inclination of the road K2, the condition of the irregular portion 101 of the road K2, presence or absence of pavement on the road K2, the width W11 of the structure 102, the height H1 of the structure 102, the width W5 of the road K2, the size R1 of the curve of the road K2, and the condition of the intersection R2 of the road K2, which are highly correlated with the driving operation of the working machine 100 along the road K2, the vehicle body 3 can be more efficiently driven along the road K2 even when the working device 2 is connected to the working vehicle 1.

The controller 40 stops the driving operation of the vehicle body 3 when the driving estimation unit 51 estimates that the vehicle body 3 is not drivable. Accordingly, the estimation that the vehicle body 3 is not drivable can be studied while the driving operation of the vehicle body 3 is stopped, and the possibility of continuation of the driving operation can be analyzed.

The working machine 100 includes the communication device 55 that transmits driving information to the external device 56, the driving information being obtained when the vehicle body 3 is driven after the driving estimation unit 51 has estimated whether the vehicle body 3 is drivable along the road K2. Accordingly, when the working machine 100 travels along the road K2, the conditions in which the vehicle body 3 is continuously driven based on the estimation result after the estimation of whether the vehicle body 3 is drivable along the road K2 can be monitored by the external device 56 based on the driving information.

The working machine 100 includes the communication device 55 that transmits a request for the driving operation under remote control to the external device 56 when the driving estimation unit 51 estimates that the vehicle body 3 is not drivable. The controller 40 drives the vehicle body 3 based on an instruction of the driving operation under remote control received by the communication device 55 from the external device 56. Accordingly, even when the driving estimation unit 51 included in the working machine 100 estimates that the vehicle body 3 is not drivable, the driving operation along the road K2 can be restarted (continued) under remote control by the external device 56.

The working machine 100 includes the communication device 55 that transmits a request for cancellation of stoppage of the driving operation to the external device 56 when the driving estimation unit 51 estimates that the vehicle body 3 is not drivable and when the controller 40 stops the driving operation. The controller 40 restarts the driving operation when the communication device 55 receives an instruction to cancel the stoppage of the driving operation. Accordingly, even when the driving operation is stopped by the driving estimation unit 51 and the controller 40 included in the working machine 100, the driving operation along the road K2 can be restarted (continued) under remote control by the external device 56. The working machine 100 includes the communication device 55 that transmits a request for a device condition that enables the vehicle body 3 to be driven to the external device 56 when the driving estimation unit 51 estimates that the vehicle body 3 is not drivable. When the communication device 55 receives the device condition that enables the vehicle body 3 to be driven transmitted from the external device 56 in response to the request, the controller 40 changes the device condition of at least one of the vehicle body 3 and the working device 2 to the device condition that enables the vehicle body 3 to be driven. Accordingly, the device condition based on which the vehicle body 3 is estimated as being not drivable can be changed to the device condition that enables the vehicle body 3 to be driven. Therefore, the driving operation of the working machine 100 can be continued.

The working machine 100 includes the communication device 55 that transmits a threshold based on which the driving estimation unit 51 has estimated that the vehicle body 3 is not drivable to the external device 56. When the communication device 55 receives a corrected threshold, the driving estimation unit 51 estimates whether the vehicle body 3 is drivable along the road K2 based on the corrected threshold. Accordingly, when the driving operation is stopped based on the estimation result obtained by the driving estimation unit 51 included in the working machine 100, the threshold (threshold for one of the road condition and the device condition) based on which it has been determined that the driving operation is to be stopped can be checked by the external device 56. In addition, the threshold can be corrected by the external device 56, so that the driving operation can be restarted based on the corrected threshold.

Second Preferred Embodiment

FIGS. 15 to 20 illustrate a working machine 100 according to a second preferred embodiment. In the description of the second preferred embodiment, description of structures similar to those in the first preferred embodiment will be omitted. The working machine 100 according to the second preferred embodiment is capable of comparing the road conditions and the device conditions during the autonomous driving operation and changing the device conditions so that the working machine 100 (working vehicle 1) does not become undrivable. The working machine 100 according to the second preferred embodiment is capable of changing the vehicle-body height H11 of the vehicle body 3.

Figure 20:
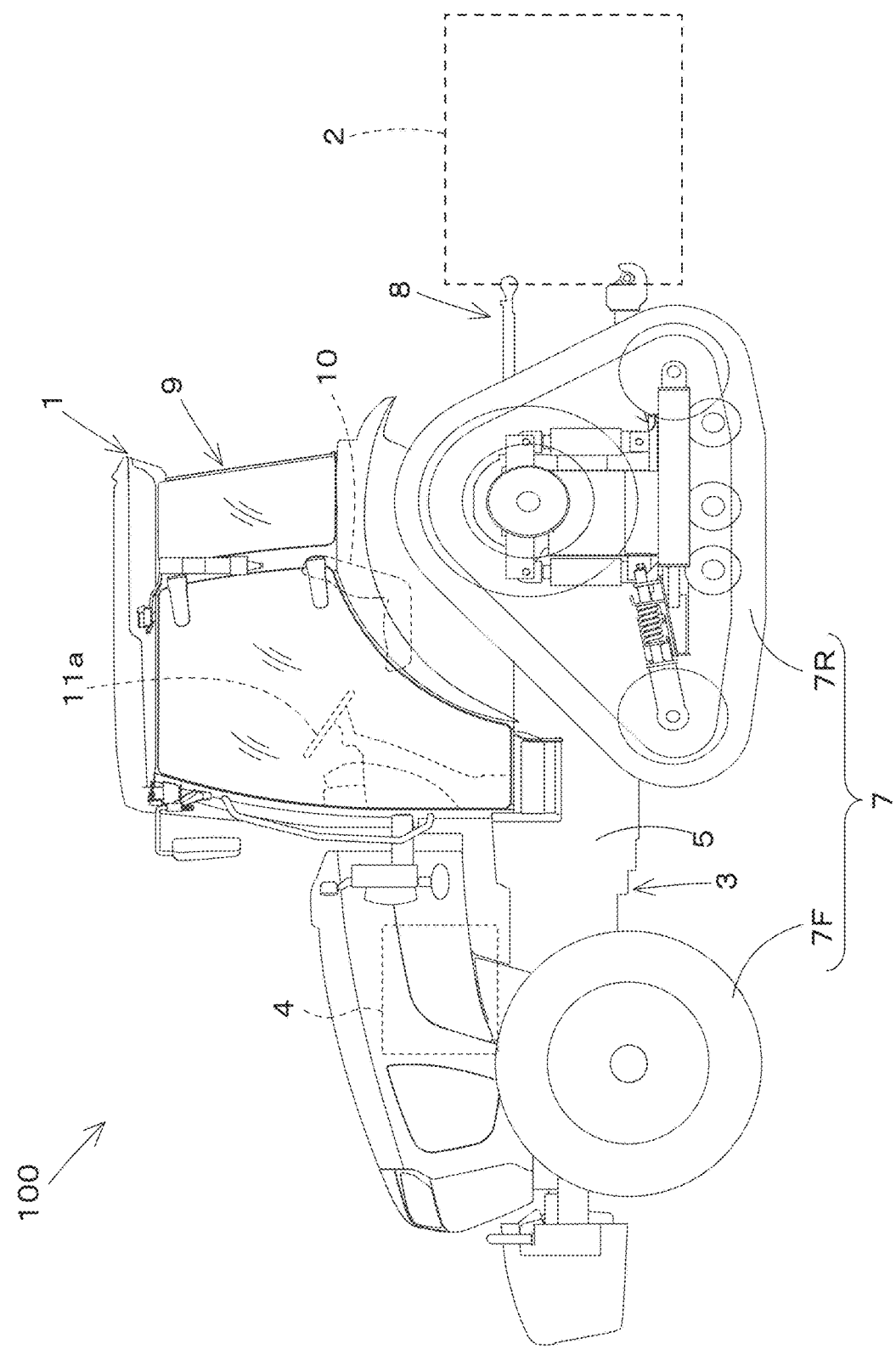
FIG. 20 illustrates the working machine according to the second preferred embodiment of the present invention.

As illustrated in FIG. 20, the rear wheels 7R of the working vehicle 1 are crawler units having a variable height. In other words, the vehicle-body height H11 of the vehicle body 3 can be changed by changing the height of the rear wheels 7R.

The rear wheels 7R including crawler units will now be described.

Figure 16:
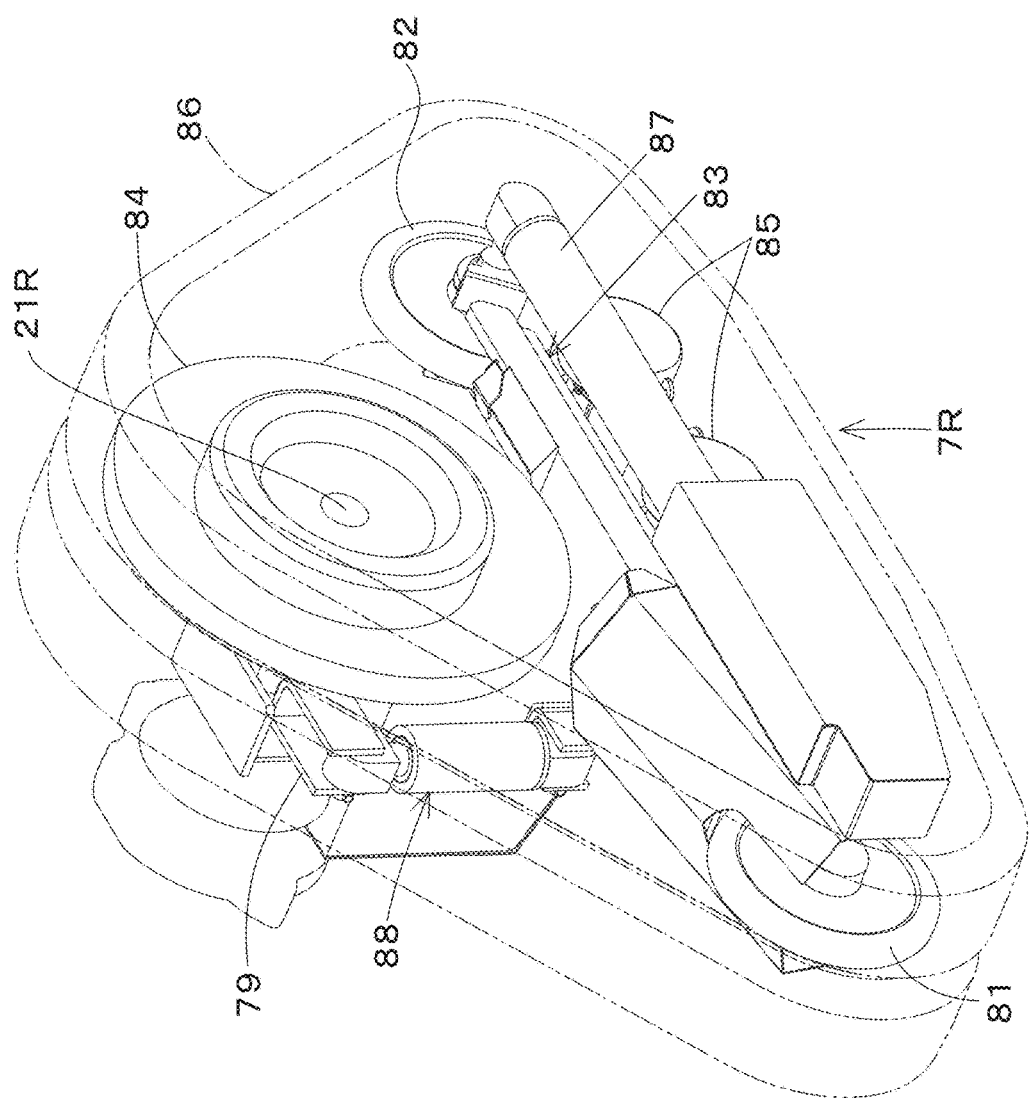
FIG. 16 is a perspective view illustrating a rear wheel including a crawler unit.
Figure 17:
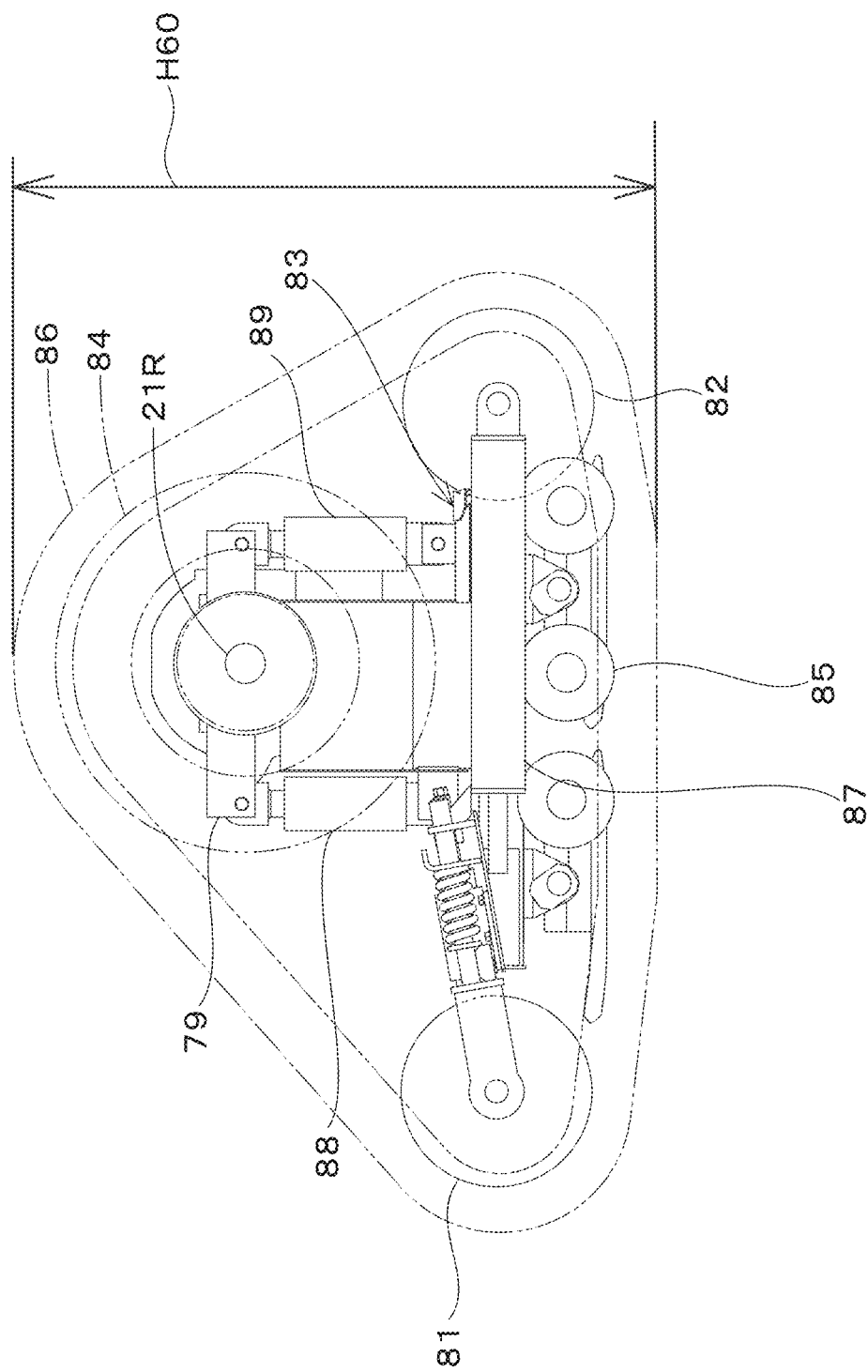
FIG. 17 is a side view of the rear wheel including the crawler unit.
Figure 18:
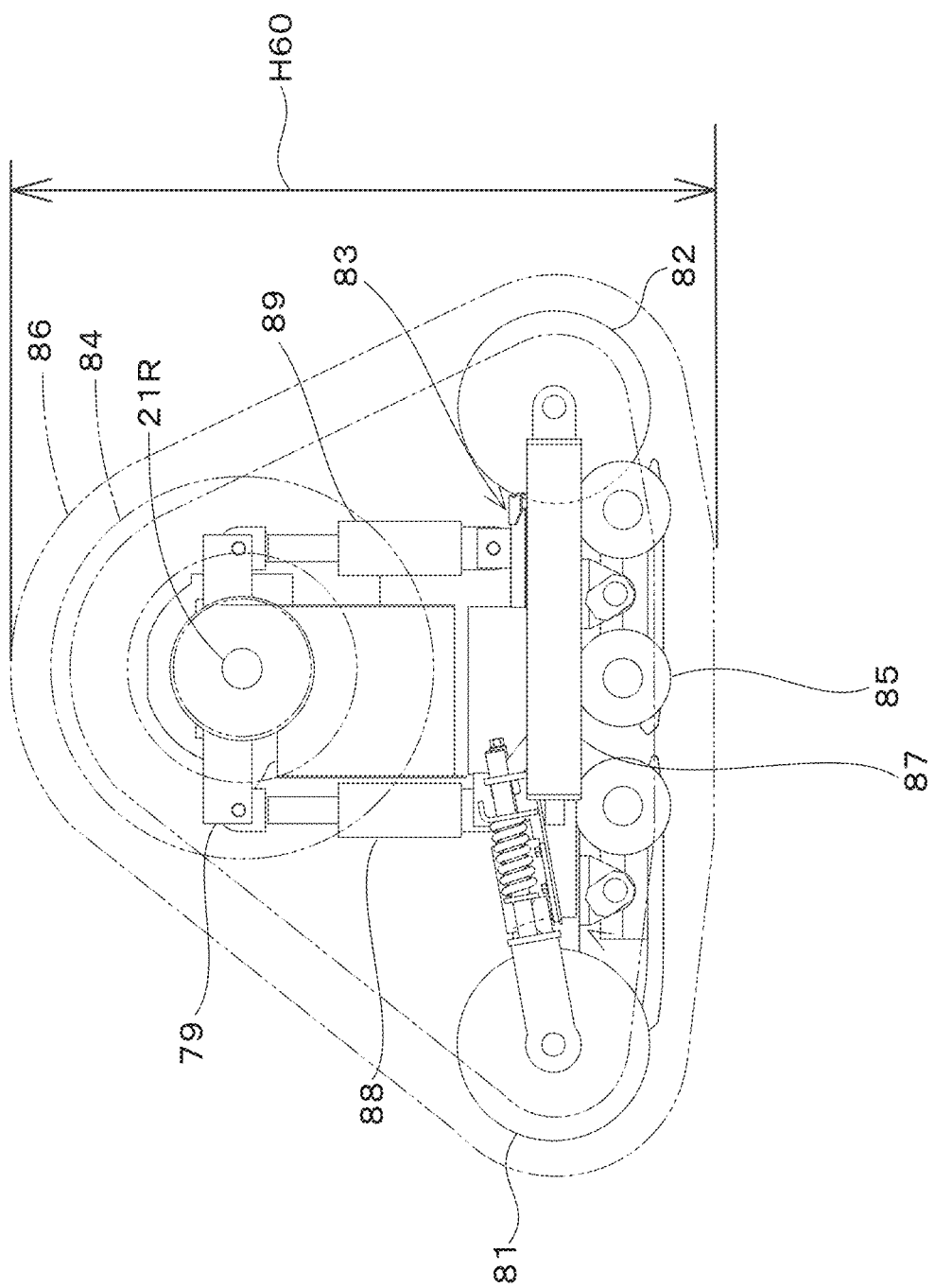
FIG. 18 illustrates the rear wheel including the crawler unit with a height increased from that in FIG. 17.

As illustrated in FIGS. 16 to 18, each of the rear wheels 7R including crawler units includes a first wheel 81, a second wheel 82, a support frame 83, a third wheel 84, and a plurality of road wheels 85. A crawler belt 86 is wrapped around the first to third wheels 81 to 84 and the road wheels 85.

The first wheel 81 is rotatably supported by a front portion of the support frame 83, and the second wheel 82 is rotatably supported by a rear portion of the support frame 83. A rear end of a hydraulic actuator 87 is connected to a rotating shaft of the second wheel 82. A front end of the hydraulic actuator 87 is supported by a bracket provided on the support frame 83 at a location adjacent to the first wheel 81.

The third wheel 84 is disposed above a region between the first wheel 81 and the second wheel 82, and is supported by the rear axle 21R that extends outward from the transmission 5 such that the third wheel 84 is rotatable together with the rear axle 21R. A hydraulic actuator 88 is disposed adjacent to a front portion of the third wheel 84, and a hydraulic actuator 89 is disposed adjacent to a rear portion the third wheel 84. Upper ends of the hydraulic actuators 88 and 89 are attached to a support bracket 79 that supports the rear axle 21R, and lower ends of the hydraulic actuators 88 and 89 are attached to the support frame 83. The hydraulic actuators 88 and 89 are extended and contracted when, for example, an opening of a control valve 61 including a solenoid valve or the like is changed. The opening of the control valve 61 can be changed by outputting a control signal to a solenoid included in the control valve 61.

When the rear wheels 7R are crawler units as described above, as illustrated in FIGS. 17 and 18, a height H60 of the crawler units can be changed by extending or contracting the hydraulic actuators 88 and 89. In other words, the vehicle-body height H11 of the working vehicle 1 (vehicle body 3) can be changed by changing the crawler height H60. The rear wheels 7R including the crawler units according to the second preferred embodiment may be applied to the first preferred embodiment.

The working machine 100 according to the second preferred embodiment may be structured such that the overall width W40 or the offset width W50 is changeable. The working machine 100 includes a connector (slider) 8 that changes the overall width W40 or the offset width W50 by horizontally swinging the working device 2.

Figure 19:
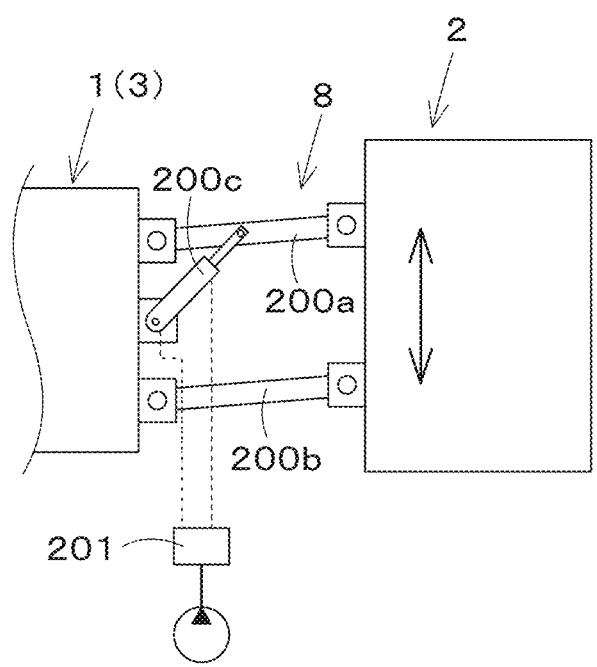
FIG. 19 illustrates a connector according to the second preferred embodiment of the present invention.

As illustrated in FIG. 19, the connector (slider) 8 includes a first swing member 200a that is connected to a rear portion of the vehicle body 3 such that the first swing member 200a is swingable in a width direction of the machine body; a second swing member 200b that is connected to the rear portion of the vehicle body 3 such that the second swing member 200b is swingable in the width direction of the machine body and that is separated from the first swing member 200a; and a hydraulic actuator 200c having at least one end connected to the vehicle body 3 and the other end connected to the first swing member 200a or the second swing member 200b. A front portion of the working device 2 is swingably connected to a rear portion of the first swing member 200a, and is also swingably connected to the rear portion of the second swing member 200b.

The hydraulic actuator 200c is, for example, a hydraulic cylinder that is hydraulically extended and contracted. The operation of the hydraulic actuator 200c, that is, expansion and contraction of the hydraulic cylinder, can be controlled by a switching valve 201. The hydraulic cylinder 200c is extended when the switching valve 201 is switched to one state, and contracted when the switching valve 201 is switched to the other state. The hydraulic cylinder is extended and contracted to move the first swing member 200a and the second swing member 200b between one position (for example, a left position) in the width direction of the machine body and the other position (for example, a right position) in the width direction of the machine body. Although the first swing member 200a and the second swing member 200b swing to move the position of the working device 2 in the width direction of the machine body in the above-described preferred embodiment, the structure is not limited to this. The connector 8 may be including a sliding mechanism that slides the working device 2 along a rail or the like, and the working device 2 may be moved in the width direction of the machine body in response to an operation of the sliding mechanism.

Figure 15:
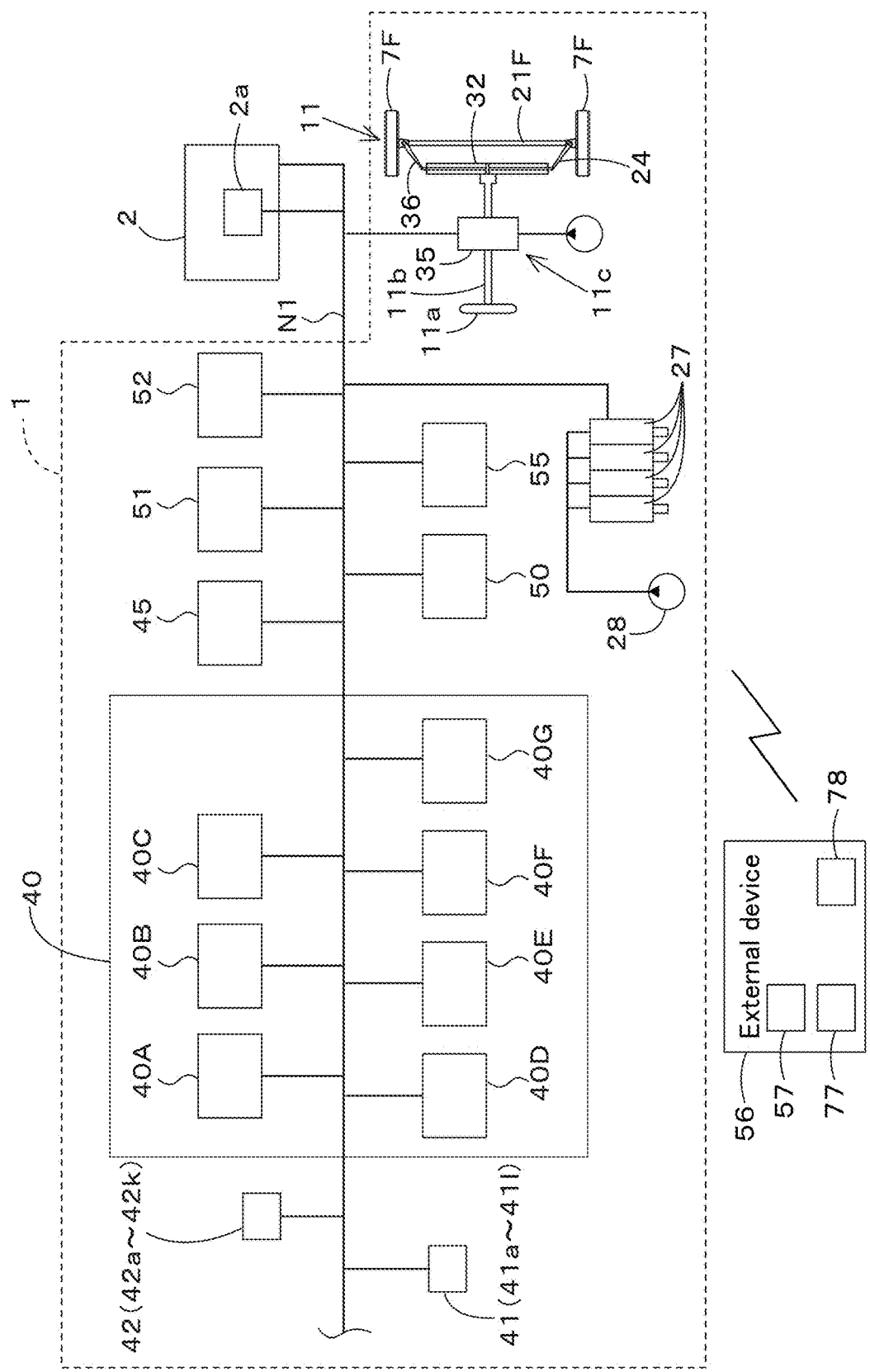
FIG. 15 illustrates a control block diagram of a working machine according to a second preferred embodiment of the present invention.

As illustrated in FIG. 15, the working machine 100 includes a position control unit (setting unit) 52. The position control unit 52 includes a CPU, electric and electronic circuits, and programs. When the autonomous driving operation of the working vehicle 1 is started under control of the controller 40 (autonomous driving control unit 40E), the driving estimation unit 51 estimates whether the vehicle body 3 is drivable along the road K2 during the autonomous driving operation. The method by which the driving estimation unit 51 estimates whether the vehicle body 3 is drivable or undrivable is the same as that in the first preferred embodiment.

When the driving estimation unit 51 estimates that the vehicle body 3 is undrivable, the position control unit 52 refers to the road conditions and the device conditions obtained by the monitor (detector) 411 and changes the device conditions so that the vehicle body 3 is drivable along the road K2.

When the device conditions are changed by the position control unit 52, the controller 40 (autonomous driving control unit 40E) does not stop but continues the autonomous driving operation.

For example, the position control unit 52 changes one of the driving mode of the vehicle body 3, the vehicle-body height H11 of the vehicle body 3, the length L20 of the vehicle body 3, the attachment heights H21 and H22 of the working device 2 in the attached state, the overall width W40, and the offset width W50 of the working device 2 with respect to the vehicle body 3, so that the vehicle body 3 is drivable along the road K2.

When the inclination θ1 of the road K2 (slope) is greater than or equal to the first threshold and when the driving mode of the working vehicle 1 is 2WD, the position control unit 52 changes the driving mode of the working vehicle 1 to 4WD before the working vehicle 1 reaches the road K2 (slope).

When the inclination θ1 of the road K2 (slope) is greater than or equal to the first threshold and when the working vehicle 1 descends the slope, the position control unit 52 causes the connector (raising/lowering device) 8 to lower the working device 2 toward the surface of the road K2 so that the weight ratio of the front portion is less than the weight ratio of the rear portion. Accordingly, the position of the center of gravity of the working vehicle 1 can be changed.

When the structure 102 is, for example, a gate, a street lamp, a pedestrian crossover bridge, a pier, or a signboard and the working vehicle 1 needs to pass under the structure 102, the vehicle-body height H11 of the vehicle body 3 may be greater than the height H1 of the structure 102. In such a case, the position control unit 52 outputs control signals to control valves that control the hydraulic actuators 88 and 89 so that the hydraulic actuators 88 and 89 contract to reduce the vehicle-body height H11 of the vehicle body 3 to a height less than the height H1 of the structure 102.

When the working vehicle 1 travels along a curve with a radius R1 of less than the minimum turning radius R3 (R1<R3) and when the length L20 of the vehicle body 3 is too long, the position control unit 52 raises the connector (raising/lowering device) 8 to a position as high as possible to reduce the length L20 of the vehicle body 3.

When the rear wheels 7R of the working vehicle 1 pass the irregular portion 101 of the road K2 and when the attachment height H22 is less than the depth F10 of the irregular portion 101, the position control unit 52 raises the connector (raising/lowering device) 8 to a position as high as possible so that the attachment height H22 is increased to a height greater than the depth F10 of the irregular portion 101.

When the working device 2 is to pass under the structure 102 and when the attachment height H21 is greater than the height H1 of the structure 102, the position control unit 52 lowers the connector (raising/lowering device) 8 to a position as low as possible so that the attachment height H21 is reduced to a height less than the height H1 of the structure 102.

When the working device 2 is offset with respect to the working vehicle 1 such that the overall width W40 is greater than the road width W5 in front of the working vehicle 1, the position control unit 52 controls the switching valve 201 of the connector (slider) 8 so that the overall width W40 is reduced to a width less than the road width W5. In other words, the position control unit 52 changes the offset width W50 to change the overall width W40 so that the working vehicle 1 is enabled to travel along the road K2.

As described above, the position control unit 52 changes the device conditions to enable the working vehicle 1 to travel along the road K2. Therefore, the working machine 100 can readily travel along the road K2. When the position control unit 52 changes the device conditions, a request for confirmation of whether the vehicle body 3 is drivable along the road K2 after the change in the device conditions may be transmitted to the external device 56. The request for confirmation include the driving information. When the external device 56 receives the request for confirmation from the working machine 100, similarly to the first preferred embodiment, the external device 56 displays the driving screen M3 as illustrated in FIG. 10. When the driving screen M3 is displayed in response to the request for confirmation and when a predetermined operation is performed on the external device 56, the external device 56 transmits confirmation information representing that confirmation has been made to the working machine 100 (communication device 55). When the communication device 55 receives the confirmation information from the external device 56, the controller 40 (autonomous driving control unit 40E) continues the autonomous driving operation.

When the device conditions are to be changed by the position control unit 52 but device conditions that enable the vehicle body 3 to be driven along the road K2 cannot be found, a request for device conditions that enable the vehicle body 3 to be driven is transmitted to the external device 56. When the device conditions that enable the vehicle body 3 to be driven cannot be found by the position control unit 52, the controller 40 (autonomous driving control unit 40E) temporarily stops the autonomous driving operation.

When the external device 56 receives the request from the position control unit 52, the setting unit 77 searches for the device conditions that enable the vehicle body 3 to be driven. When the setting unit 77 finds the device conditions that enable the vehicle body 3 to be driven, the external device 56 transmits the device conditions that enable the vehicle body 3 to be driven to the working machine 100 (working vehicle 1). The position control unit 52 changes the device conditions to those that are transmitted from the external device 56 and that enable the vehicle body 3 to be driven. When the position control unit 52 changes the device conditions to those that enable the vehicle body 3 to be driven, the controller 40 (autonomous driving control unit 40E) restarts the autonomous driving operation.

The working machine 100 includes the vehicle body 3 to which the working device 2 is connectable; the detector (monitor) 411 that detects a road condition that is a condition of the road along which the vehicle body 3 is driven; and the position control unit 52 that refers to the road condition detected by the detector 411 and a device condition in which the working device 2 is connected to the vehicle body 3 and changes the device condition so that the vehicle body 3 is drivable along the road K2. Since the position control unit 52 changes the device condition to a device condition that enables the vehicle body 3 to be driven along the road K2, the driving operation along the road K2 can be easily performed.

The position control unit 52 changes at least one of the driving mode of the vehicle body 3, the vehicle-body height H11 of the vehicle body 3, the weight ratio of the vehicle body 3, and the length L20 of the vehicle body 3 as the device condition. Accordingly, by changing the driving mode of the vehicle body 3, the vehicle-body height H11, the weight ratio of the vehicle body 3, and the length L20 of the vehicle body 3, which are highly correlated with the driving operation along the road K2, the driving operation along the road K2 can be continued as long as possible.

The position control unit 52 changes at least one of the attachment heights H21 and H22 of the working device 2 in an attached state, the overall width W40, and the offset width W50 of the working device 2 with respect to the vehicle body 3 as the device condition. Accordingly, by changing the attachment heights H21 and H22, the overall width W40, the offset width W50 of the working device 2 with respect to the vehicle body 3, and the length L30 of the working device 2, which further reflect the conditions of the working device 2, the driving operation along the road K2 can be continued as long as possible.

The communication device 55 is provided. The communication device 55 transmits a request for confirmation of whether the vehicle body 3 is drivable along the road K2 to the external device 56 when the position control unit 52 has changed the device condition. Accordingly, the external device 56 can easily confirm whether the vehicle body 3 is drivable and monitor how the device condition has been changed by the position control unit 52.

The position control unit 52 transmits a request for the device condition to the external device 56, the device condition enabling the vehicle body 3 to be driven under the road condition detected by the detector (monitor) 411. Accordingly, when the device condition that enables the vehicle body 3 to be driven cannot be found by the position control unit 52, a request for the device condition is transmitted to the external device 56, so that the autonomous driving operation can be continued.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
  a vehicle body to which a working device is connectable, the vehicle body including a traveling device;
  a steering device operable to steer the traveling device;
  a monitor to detect a road condition of a road along which the vehicle body is driven, the road being outside an agricultural field and having a road width;
  a driving estimator to estimate whether the vehicle body is drivable along the road based on the road condition detected by the monitor and a device condition in which the working device is connected to the vehicle body; and
  a controller to control an autonomous driving operation of the vehicle body based on an estimation result obtained as a result of the estimation by the driving estimator; wherein
  when the monitor detects, as the road condition, a curve in a road in front of the vehicle body, the driving estimator is configured or programmed to calculate a minimum turning radius of the vehicle body from a sum of lengths of the working device and the vehicle body and from a maximum steering angle of the steering device;
  when the curve detected by the monitor has a radius less than the minimum turning radius, or when the curve has a radius greater than the minimum turning radius but a difference between the radius of the curve and the minimum turning radius is less than or equal to a predetermined threshold, the driving estimator is configured or programmed to estimate that the vehicle body is not drivable; and
  the controller is configured or programmed to:
    continue to control the autonomous driving operation when the driving estimator estimates that the vehicle body is drivable; and
    stop the autonomous driving operation before the vehicle body reaches the curve when the driving estimator estimates that the vehicle body is not drivable.

2. The working machine according to claim 1, further comprising a communicator to transmit, to an external device, driving information obtained when the autonomous driving operation of the vehicle body is continued under the control of the controller; wherein
the controller is configured or programmed to autonomously drive the vehicle body based on a command received from the external device after the transmission of the driving information from the communicator to the external device.

3. The working machine according to claim 2, wherein, when the command received after the controller has stopped the autonomous driving operation based on the estimation result that the vehicle body is not drivable is to cancel stoppage of the autonomous driving operation of the vehicle body, the controller is configured or programmed to cancel the stoppage and restart the autonomous driving operation of the vehicle body.

4. The working machine according to claim 2, wherein, when the command received after the controller has stopped the autonomous driving operation based on the estimation result that the vehicle body is not drivable is an instruction of the autonomous driving operation under remote control, the controller is configured or programmed to restart the autonomous driving operation based on the instruction of the autonomous driving operation under the remote control.

5. The working machine according to claim 2, wherein
the communicator is configured or programmed to transmit, to the external device, a threshold for one of the road condition and the device condition based on which the driving estimator has estimated that the vehicle body is not drivable; and
when the communicator receives a corrected threshold, the driving estimator is configured or programmed to estimate whether the vehicle body is drivable along the road based on the corrected threshold.

6. The working machine according to claim 2, wherein the communicator is configured or programmed to transmit the driving information to the external device after the driving estimator has estimated whether the vehicle body is drivable along the road.

7. The working machine according to claim 2, wherein
the communicator is configured or programmed to transmit, to the external device, a request for the autonomous driving operation under remote control when the driving estimator estimates that the vehicle body is not drivable; and
the controller is configured or programmed to drive the vehicle body based on an instruction of the autonomous driving operation under the remote control received by the communicator from the external device.

8. The working machine according to claim 2, wherein
the communicator is configured or programmed to transmit, to the external device, a request for a device condition that enables the vehicle body to be driven when the driving estimator estimates that the vehicle body is not drivable; and
when the communicator receives the device condition that enables the vehicle body to be driven transmitted from the external device in response to the request, the controller is configured or programmed to change the device condition of at least one of the vehicle body and the working device to the device condition that enables the vehicle body to be driven.

9. The working machine according to claim 2, wherein
the communicator is configured or programmed to transmit, to the external device, a threshold based on which the driving estimator has estimated that the vehicle body is not drivable; and
when the communicator receives a corrected threshold, the driving estimator is configured or programmed to estimate whether the vehicle body is drivable along the road based on the corrected threshold.

10. The working machine according to claim 1, wherein the driving estimator is configured or programmed to acquire, as the device condition, at least one of a driving mode of the vehicle body, a vehicle-body height of the vehicle body, a vehicle-body width of the vehicle body, a weight ratio of the vehicle body, and a length of the vehicle body, and to estimate whether the vehicle body is drivable along the road based on the acquired device condition and the road condition.

11. The working machine according to claim 1, wherein the driving estimator is configured or programmed to acquire, as the device condition, at least one of an attachment height of the working device in an attached state, an attachment width, an overall width, an offset width of the working device with respect to the vehicle body, and a length of the working device, and to estimate whether the vehicle body is drivable along the road based on the acquired device condition and the road condition.

12. The working machine according to claim 1, wherein the driving estimator is configured or programmed to acquire, as the road condition, at least one of an inclination of the road, a condition of an irregular portion of the road, presence or absence of pavement on the road, a width of a structure on the road, a height of the structure, and a width of the road, and to estimate whether the vehicle body is drivable along the road based on the acquired road condition and the device condition.

13. The working machine according to claim 1, wherein the working machine is provided with a setting controller capable of changing the device condition.

14. A working machine comprising:
a vehicle body to which a working device is connectable, the vehicle body including a traveling device;
a steering device operable to steer the traveling device;
a monitor to detect a road condition of a road along which the vehicle body is driven, the road being outside an agricultural field and having a road width;
a driving estimator to estimate whether the vehicle body is drivable along the road based on the road condition detected by the monitor and a device condition in which the working device is connected to the vehicle body; and
a controller to control an autonomous driving operation of the vehicle body based on an estimation result obtained as a result of the estimation by the driving estimator; wherein
when the monitor detects, as the road condition, an intersection in a road in front of the vehicle body, the driving estimator is configured or programmed to calculate a path along which the vehicle body approaches and turns the intersection based on an overall length of the working device and the vehicle body, a maximum steering angle of the steering device, and an overall width that is a width when the working device is connected to the vehicle body;
when the path for causing the vehicle body and the working device to turn left or right has a portion that protrudes from the road, or when a gap between the path and an end portion of the road is less than or equal to a predetermined threshold, the driving estimator is configured or programmed to estimate that the vehicle body is not drivable; and
the controller is configured or programmed to:

continue to control the autonomous driving operation when the driving estimator estimates that the vehicle body is drivable; and stop the autonomous driving operation before the vehicle body reaches the intersection when the driving estimator estimates that the vehicle body is not drivable.

\* \* \* \* \*